Sept. 24, 1940. H. F. KLINGELE Re. 21,582
AUTOMATIC MULTIPLE CRANK-PIN GRINDING MACHINE
Original Filed Feb. 24, 1930 11 Sheets-Sheet 1
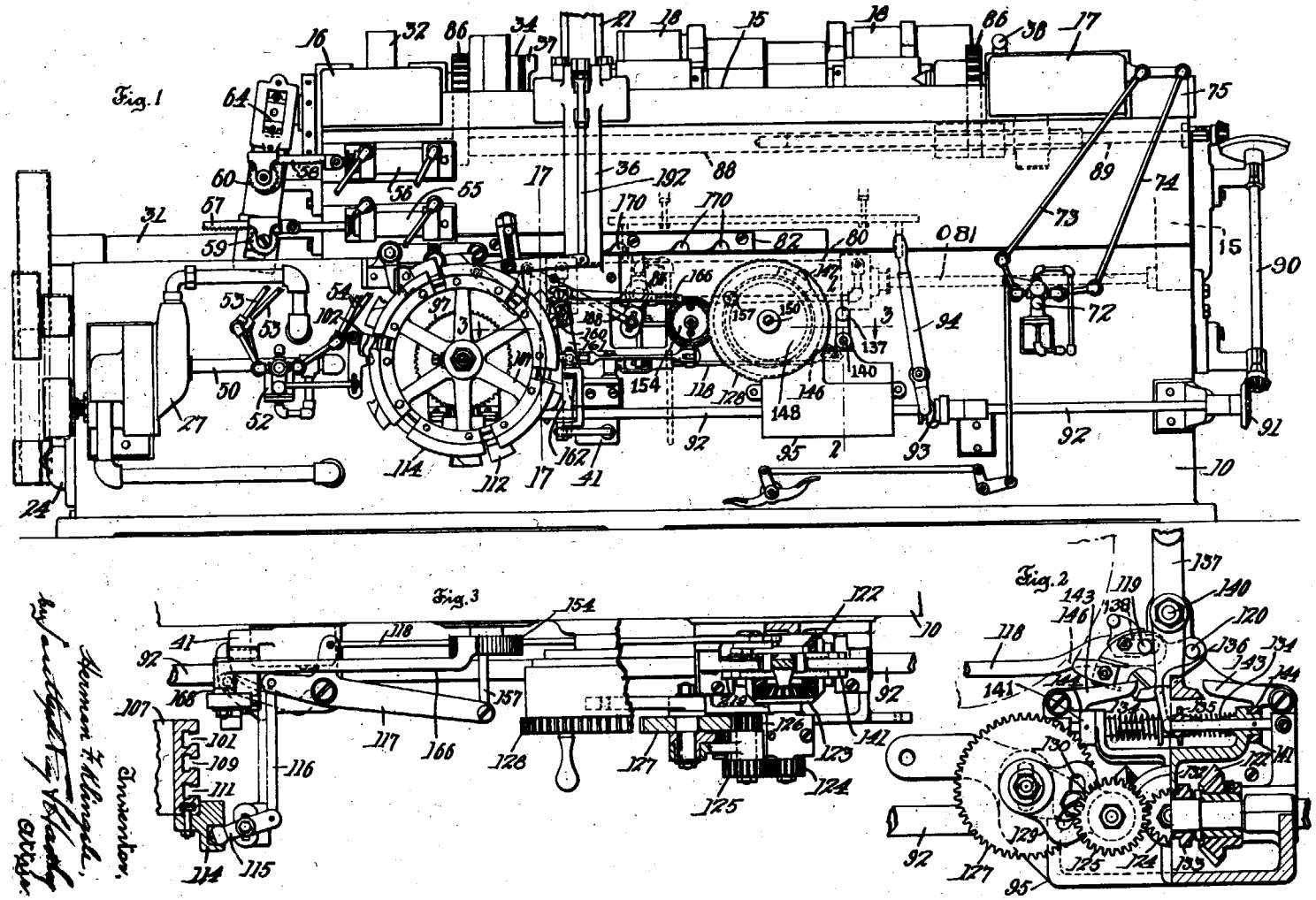

AUTOMATIC MULTIPLE CRANK-PIN GRINDING MACHINE

Original Filed Feb. 24, 1930 11 Sheets-Sheet 2

Inventor,
Herman F. Klingele,
by Southgate Fay & Hardy
attys.

AUTOMATIC MULTIPLE CRANK-PIN GRINDING MACHINE
Original Filed Feb. 24, 1930 11 Sheets-Sheet 3
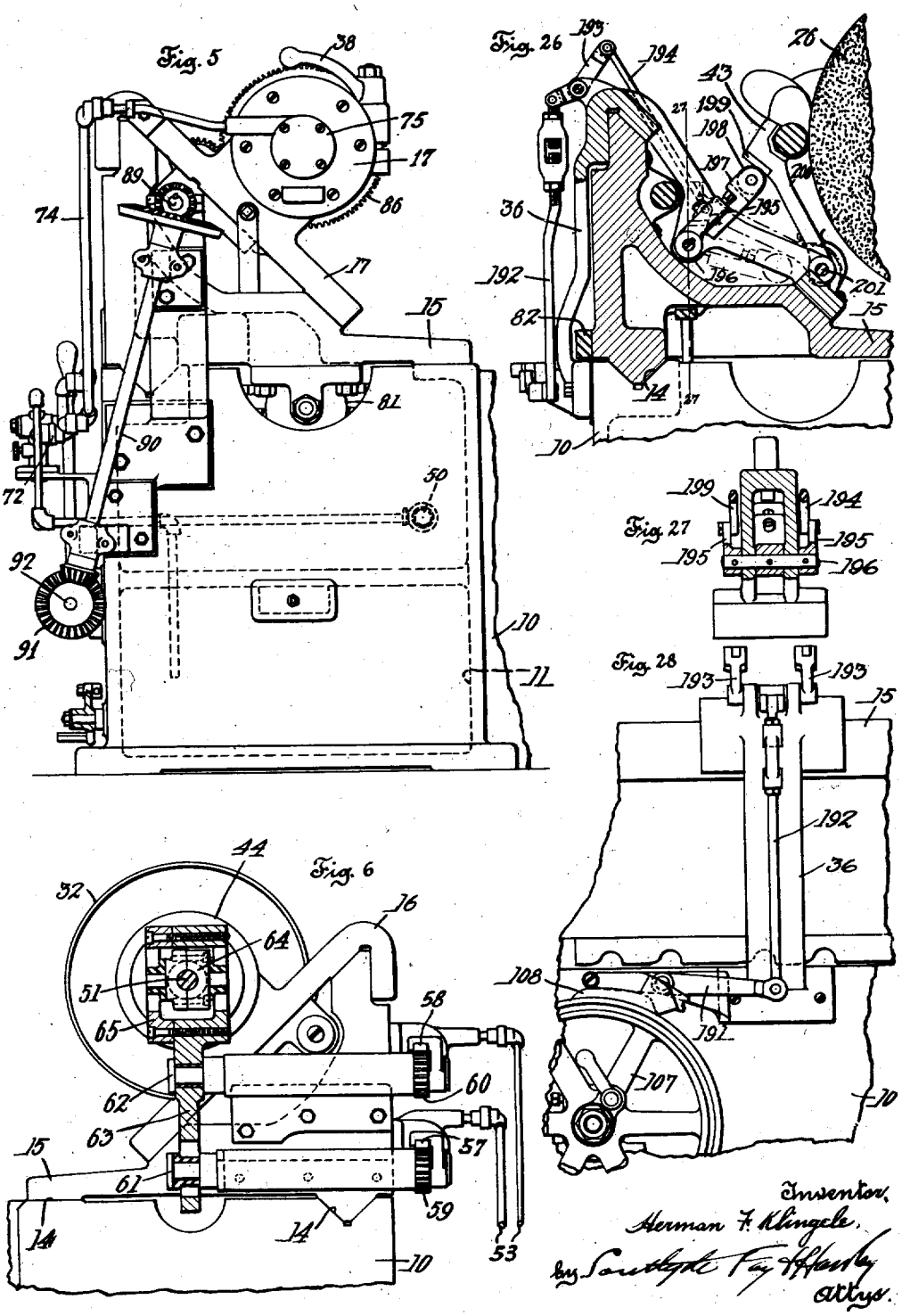

Sept. 24, 1940. H. F. KLINGELE Re. 21,582
AUTOMATIC MULTIPLE CRANK-PIN GRINDING MACHINE
Original Filed Feb. 24, 1930 11 Sheets-Sheet 4
Fig. 7
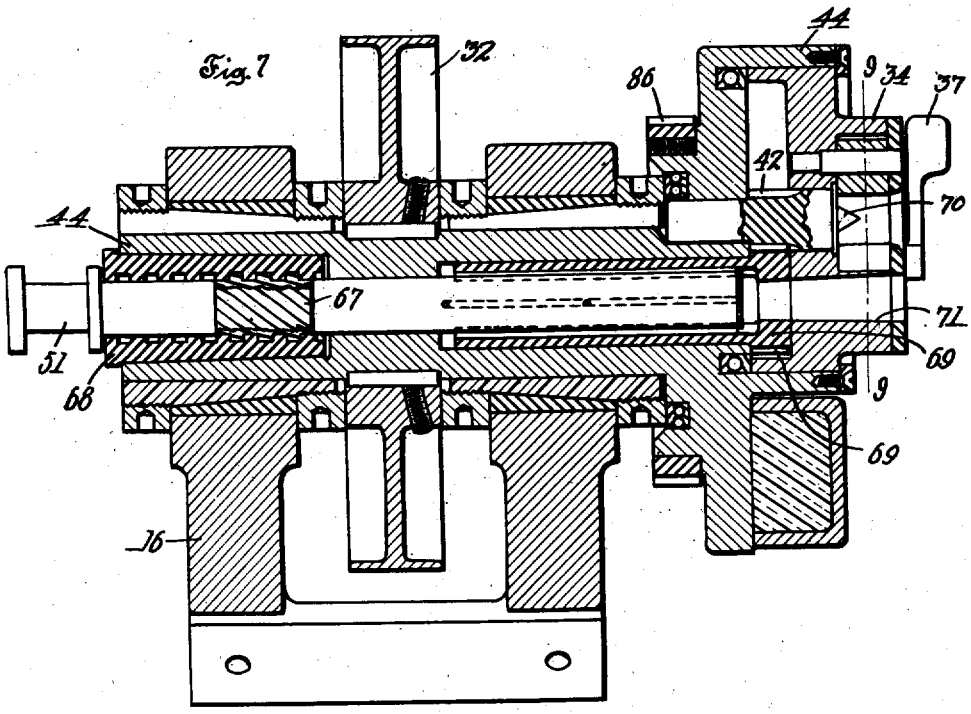
Fig. 8
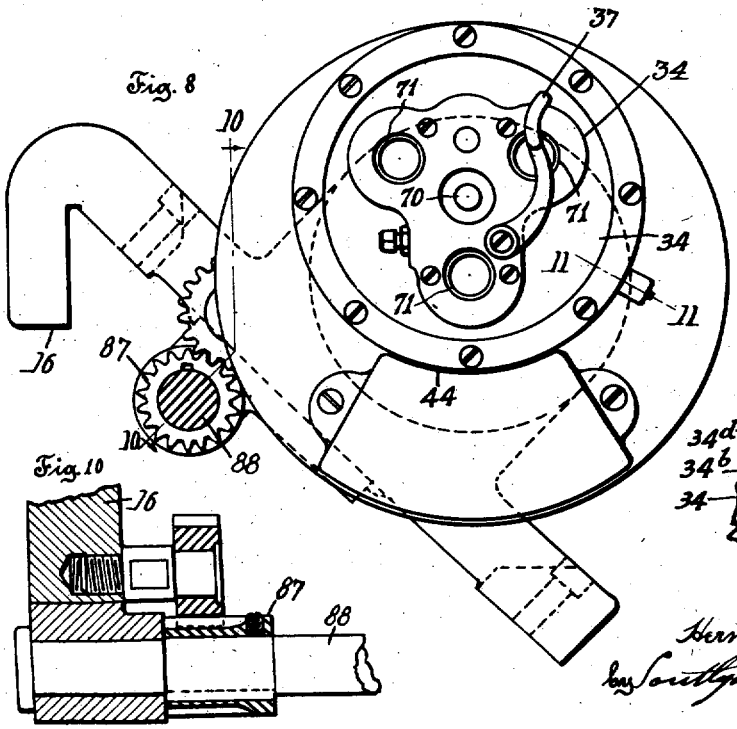
Fig. 9
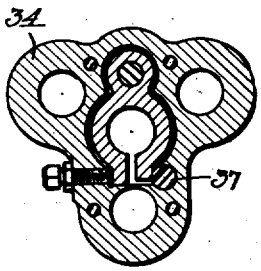
Fig. 10
Fig. 11
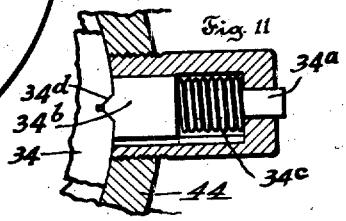
Inventor
Herman F. Klingele
by Smith Fay & Hartley
Attys

AUTOMATIC MULTIPLE CRANK-PIN GRINDING MACHINE

Original Filed Feb. 24, 1930 11 Sheets-Sheet 5

Inventor
Herman F. Klingele
by Coulter & Bergquist
Attys

AUTOMATIC MULTIPLE CRANK-PIN GRINDING MACHINE

Original Filed Feb. 24, 1930 11 Sheets-Sheet 6

Inventor,
Herman F. Klingele
by Coulter, Pyle & Hardy
Attys.

AUTOMATIC MULTIPLE CRANK-PIN GRINDING MACHINE

Original Filed Feb. 24, 1930 11 Sheets-Sheet 7

Inventor.
Herman F. Klingele,
by Southgate Fay & Hardy
Attys.

AUTOMATIC MULTIPLE CRANK-PIN GRINDING MACHINE
Original Filed Feb. 24, 1930 11 Sheets-Sheet 8
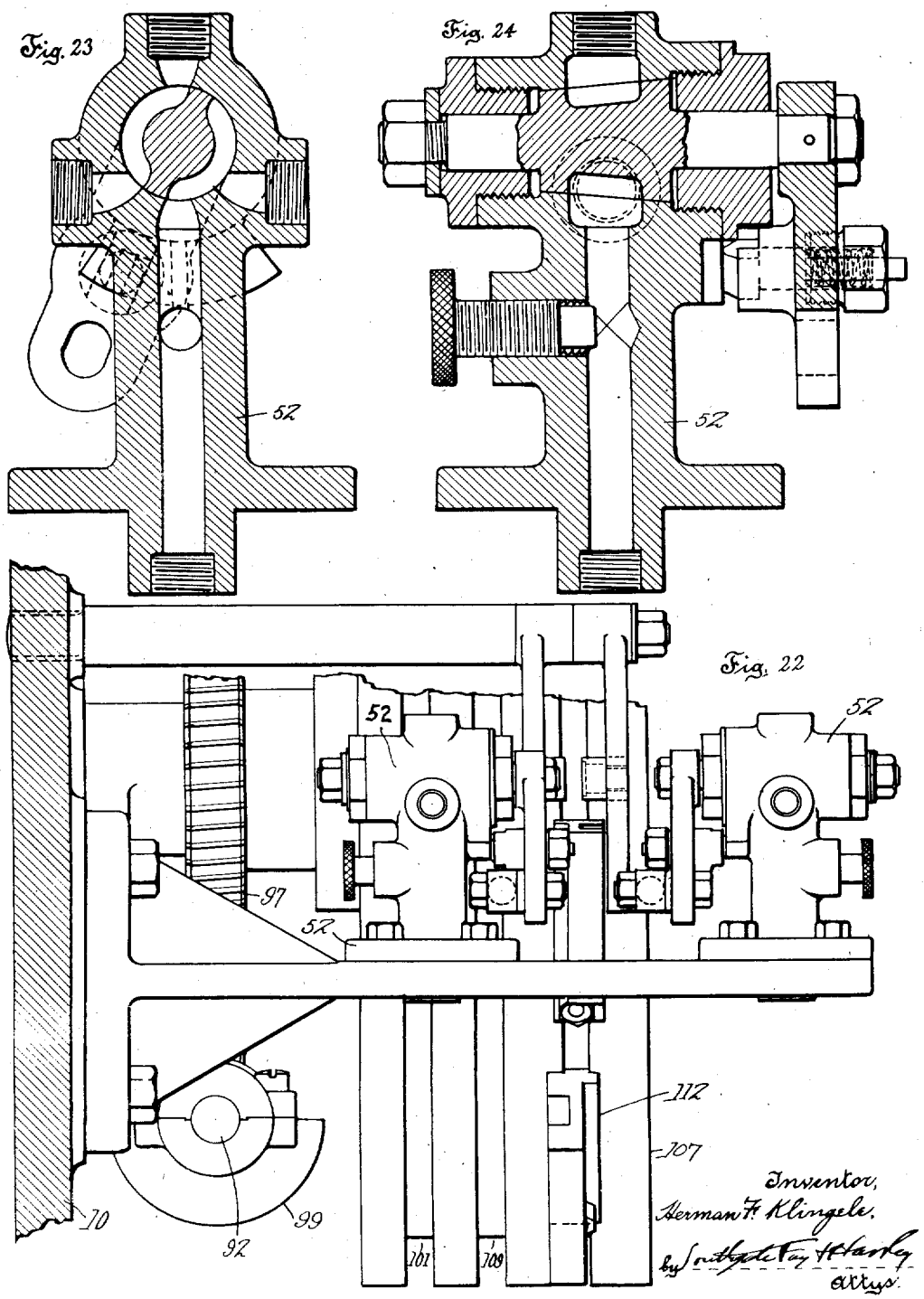

AUTOMATIC MULTIPLE CRANK-PIN GRINDING MACHINE
Original Filed Feb. 24, 1930 11 Sheets-Sheet 9
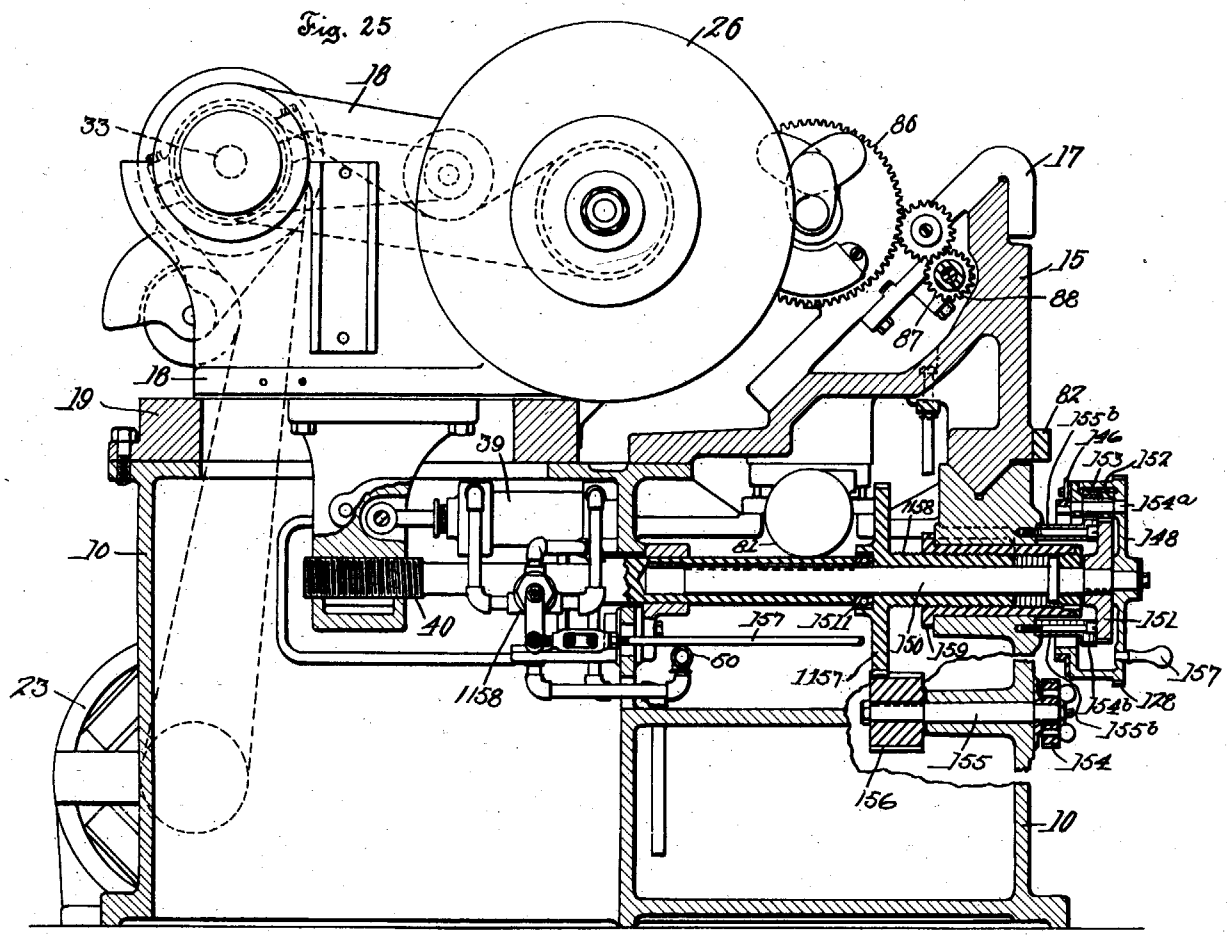
Inventor,
Herman F. Klingele
by Sandlgate & Harley
Attys.

AUTOMATIC MULTIPLE CRANK-PIN GRINDING MACHINE
Original Filed Feb. 24, 1930 11 Sheets-Sheet 10
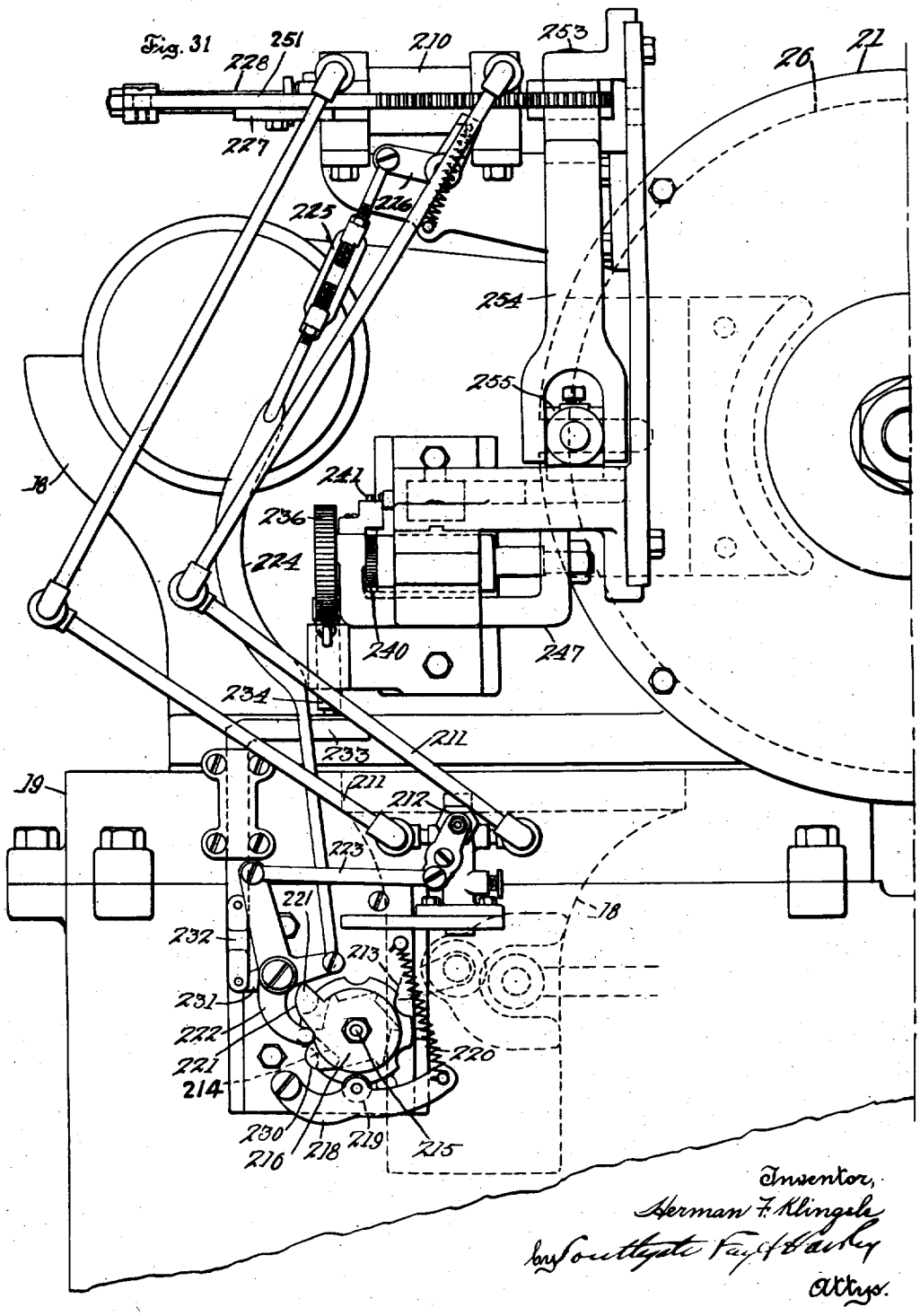
Inventor,
Herman F. Klingele
by Southgate Fay & Hanley
Attys.

AUTOMATIC MULTIPLE CRANK-PIN GRINDING MACHINE
Original Filed Feb. 24, 1930 11 Sheets-Sheet 11.
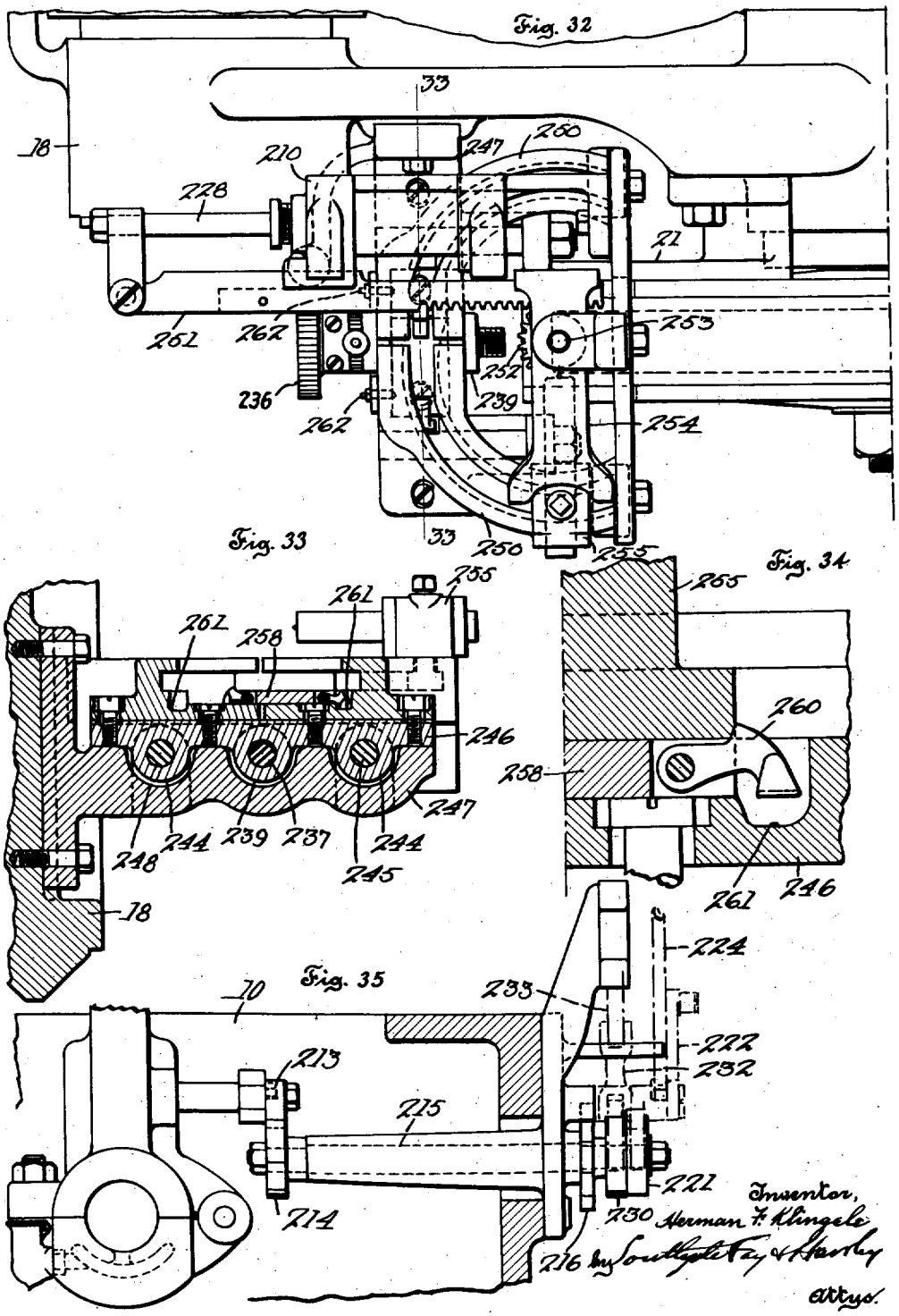

Reissued Sept. 24, 1940

Re. 21,582

UNITED STATES PATENT OFFICE 21,582

AUTOMATIC MULTIPLE CRANK-PIN GRINDING MACHINE

Herman F. Klingele, Worcester, Mass., assignor to Landis Tool Company, Waynesboro, Pa., a corporation of Pennsylvania Original No. 2,014,768, dated September 17, 1935, Serial No. 430,513, February 24, 1930. Renewed August 30, 1932. Application for reissue August 14, 1936, Serial No. 96,125

58 Claims. (Cl. 51—72)

This invention relates to a machine for rough-grinding or finish-grinding the crank-pins on crank-shafts for multiple cylinder engines.

The principal objects of the invention are to provide a machine of this character which will grind the crank-pins to a uniform diameter, within the limits usually prescribed for this class of work, without handling the crank-shaft after it is put into the machine or other outside interference; to provide means whereby the machine will grind all the crank-pins and then automatically stop when the last pin is ground; to provide a machine which will handle varying lengths of crank-shafts for different engines; to provide for driving the work, and operating the pump which supplies the water used in wet grinding by a separate motor, this motor being the one automatically stopped when the work is completed; to provide means for controlling the motion and location of the work table by the operator when inserting a new shaft or for experimental purposes, and to provide a construction on which the table, head stock and foot stock, when once set up with the crank-shaft, will be permanently fixed with respect to each other thereafter and in which the position thereof on the base is at all times under the control of the machine when working on a crank-shaft.

Other objects and advantages of the invention will appear hereinafter.

Reference is to be had to the accompanying drawings in which:

Fig. 1 is a front elevation of a complete machine embodying this invention in a form to finish grind the crank-pins of a six-cylinder engine;

Fig. 2 is a part sectional view of the feed box on the line 2—2 of Fig. 1 and drawn on a larger scale, the cover shown in Fig. 1 being removed;

Fig. 3 is a sectional plan view on the line 3—3 of Fig. 1 of the feed box and of the cam lever controlling it in part;

Fig. 5 is a partial elevation of the right hand end of the machine;

Fig. 6 is a part sectional elevation of the left hand end of the table;

Fig. 7 is a sectional elevation of the headstock;

Fig. 8 is an end view of the headstock showing the position of the pinion and intermediate pinion for transmission of motion to the footstock;

Fig. 9 is a section on the line 9—9 of Fig. 7 through the chuck, showing the method of securing the work in the chuck;

Fig. 10 is a section on the line 10—10 of Fig. 8 showing the pinion and intermediate pinion;

Fig. 11 is a section on a larger scale on the line 11—11 of Fig. 8 showing the giveway stop for the varying position of the crankpins on the work;

Fig. 22 is an end view of the valves and cams that control the angular position of the work;

Fig. 23 is a cross section of the hydraulic valve used for operating all cylinders except the one controlling the table;

Fig. 24 is a longitudinal section of the same;

Fig. 25 is a part sectional end elevation of the machine, showing the quick and slow control of feed for the wheel slide, also the wheel drive;

Fig. 26 is a cross section through the center of the steadyrest;

Fig. 27 is a cross section on the line 27—27 of Fig. 26 of the steadyrest alone.

Fig. 28 is a front elevation of the steadyrest and the cam and lever controlling it;

Fig. 31 is an elevation of the wheel truing device;

Fig. 32 is a plan of the wheel truing device showing the parts only that are supported on the wheel slide;

Fig. 33 is a cross section on the line 33—33 of Fig. 32;

Fig. 34 is an enlarged portion of Fig. 33; and

Fig. 35 is a rear sectional elevation showing the connection of the wheel slide with the cam shaft that controls the operation of the truer.

Figure 4:
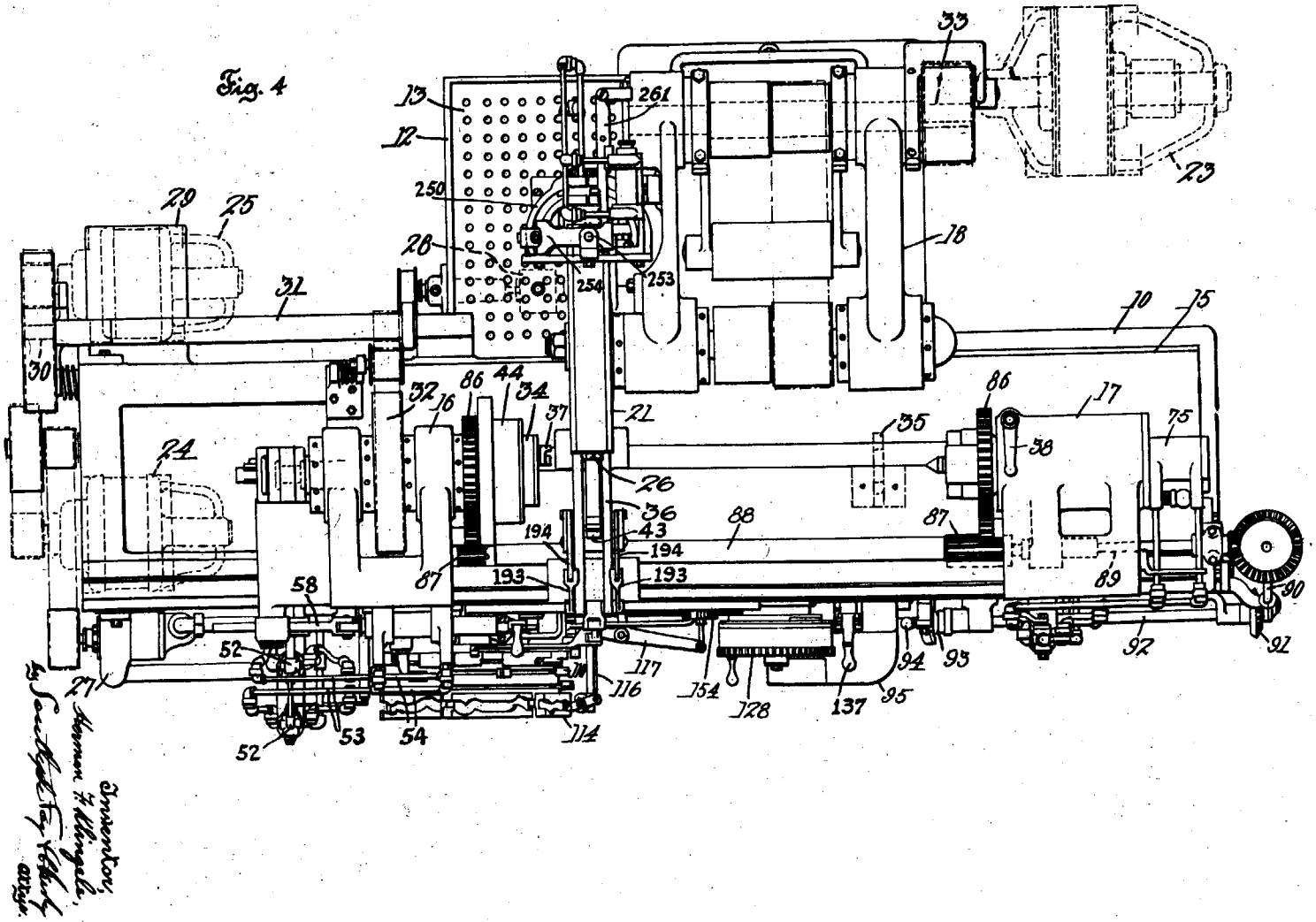
Fig. 4 is a plan of the complete machine.
Figure 12:
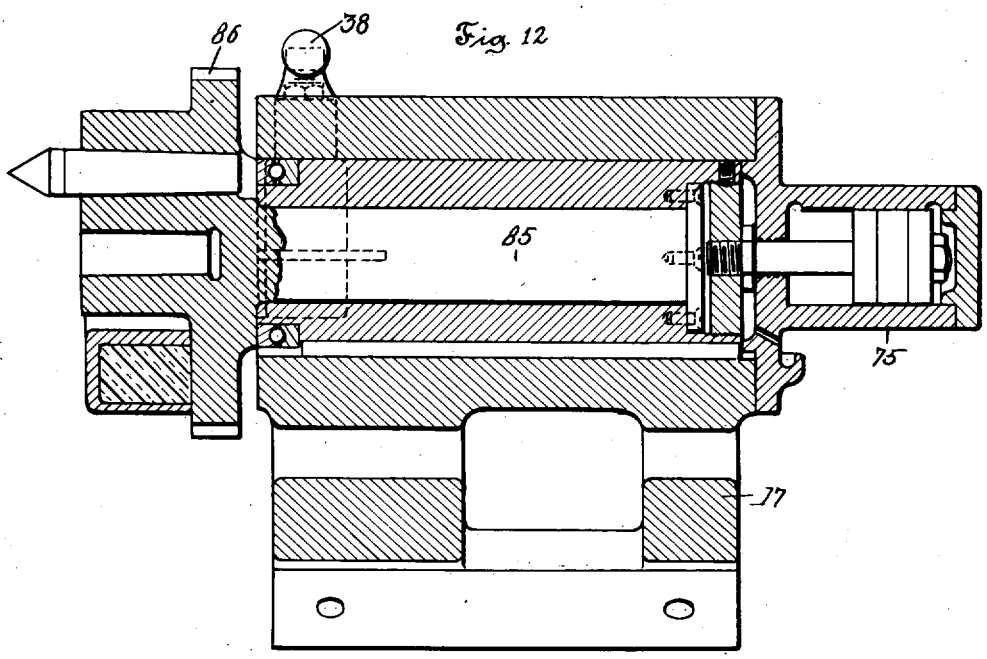
Fig. 12 is a sectional elevation of the footstock.
Figure 13:
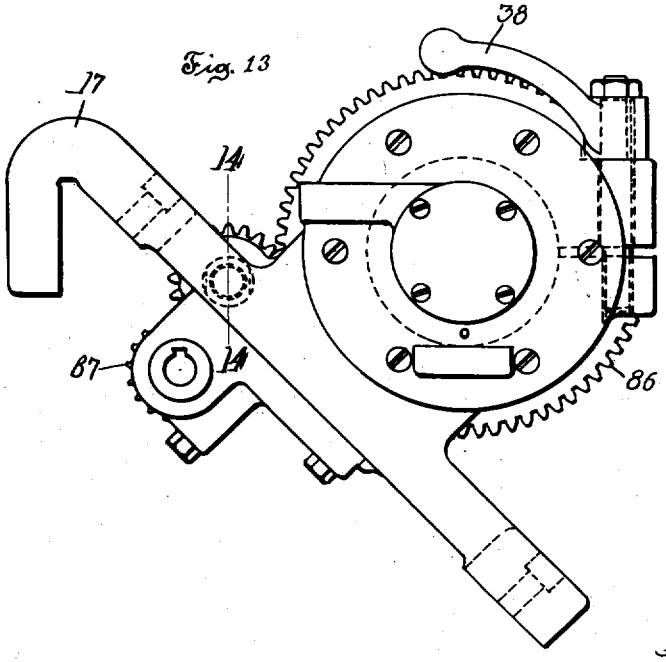
Fig. 13 is an end elevation of the same.
Figure 14:
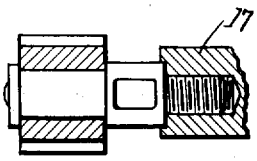
Fig. 14 is a section on the line 14—14 of Fig. 13 showing the mounting of the intermediate pinion.

I prefer to mount this machine on a rigidly constructed T-shaped cast-iron base 10 arranged with an oil reservoir 11 at the bottom, and an open tank 12, with a removable perforated cover 13, for the grinding liquid.

Mounted on ways 14 on the base is a slidable table 15 carrying a head-stock 16 and a foot-stock 17. The head-stock is rigidly secured to the left hand end of the table. The foot-stock is adjustably but rigidly secured to the right hand end of the table. The three parts, table, head-stock and foot-stock, for all practical purposes, are in one piece when once set up for grinding a particular crank-shaft. The position of this unit on the base is at all times under the control of the machine when working on a crank-shaft. The motion and location of the table can be controlled also by the operator for the purpose of inserting a new shaft or for experimenting.

The wheel slide 18 is carried by a wheel slide block 19 secured to one leg of the T-shaped base. A grinding wheel truing device and also the wheel guard 21 are secured to the wheel slide 18.

I have found it desirable to make a special machine for a crank-shaft with a given throw, and a different one for a crank-shaft having a different number of crank-pins. The machine shown is designed for a crank-shaft for a six-cylinder engine. Three motors 23, 24 and 25 are used to drive the machine. The motor 23 drives the grinding-wheel 26. The motor 24 drives the pump 27 to provide and maintain continuous hydraulic pressure. These two motors run continuously under the control of the operator. The third motor 25 drives the work and also the pump 28 which supplies the water used in wet grinding, and controls several automatic features as will appear.

The motor 25 is started by the operator every time a new shaft is ready to be ground and is automatically stopped when the grinding is completed for the whole shaft. This motor is shown as located on a shelf 29 at the rear of the left hand end of the base and belted directly to a pulley on the drum shaft 30. From a drum 31 on this shaft a belt drives a pulley 32 on the spindle 44 of the head-stock. This belt has to travel laterally along the drum when the table is moved along.

The motor 24 is located in an opening provided at the bottom of the left hand end of the base. The motor 23 is shown as set up on the floor and belted directly to the pulley shaft 33 on the wheel slide.

The sequence of operation is as follows: The operator picks up a crank-shaft by means of an air hoist or other convenient lift and inserts the front end, that is, the one opposite the flanged end, in the chuck 34 at the head-stock. The opposite end of the crank-shaft rests on a movable support 35 which brings it in line with the center. The foot-stock is moved hydraulically, as will appear, so that the shaft is now on the two dead centers, and the exact location of the first crank-pin has to be fixed before the shaft is secured in position. The center of the steady-rest 36 coincides in lateral position with the center of the grinding wheel.

By sliding a gauge over the end of the jaw 43 of the steady-rest, the slight movement of the table to bring the crank-pin shoulders in position to fit the gauge exactly, can be determined (see Fig. 26). The gauge is made the exact length of the crank-pins. The operator now knows that the crank-shaft is correctly located longitudinally and removes the gauge. The jaw 43 of the steady-rest is now made to assume a contact position on a correctly located pin and held there by another suitable gauge. The crank-shaft is turned until this contact is obtained, and the work is secured by a clamping means controlled by a handle 37 and then a pinching handle 38 at the foot-stock is set. This latter handle is arranged to maintain pressure on the center independently of the hydraulic pressure.

During the finishing of the entire crank-shaft the mechanism makes one complete revolution. A complete set of cams is maintained for each sixth of the revolution to produce identical movements. Upon completing the grinding of a pin the feeding in of the grinding wheel stops. The wheel holds its position at the finished grinding point for a short while, then the steady-rest descends and the table moves back by hydraulic pressure simultaneously.

Then the table and work move longitudinally and the work revolves simultaneously, if necessary, through an angle of 120°. A yielding means is provided for locking the work in an indexed position. This yielding means consists of a rod 34*a* provided with a head 34*b* against which a spring 34c bears and normally forces the head radially inward into contact with the chuck carrying the work. This head has a V-shaped rib 34*d* which is adapted to engage a similarly shaped recess or notch in the chuck or work support 34 for holding the same in a predetermined indexed position. Then the steady-rest comes up against the work and the wheel-slide moves in up to the point where cutting begins. This is done by hydraulic pressure. The mechanical fine feed has already been thrown in, so grinding commences thereafter. The hydraulic feed forces the wheel slide in under the control of a screw 40 as will appear. As the grinding proceeds, the steady-rest is being gradually elevated so that the finished grinding position is reached at the same time by the grinding wheel. Then follows the slight holding position of the grinding wheel again, and the above operations are repeated over and over until the several pins are ground. The machine is stopped electrically by crank motion which will be described, by working the push-button release 41 of a stopping lever.

Every time the machine stops an adjustment is made automatically, allowing the wheel slide to advance one thousandth of an inch which represents the amount to be trued off on the finishing operation before the next shaft is begun. Automatic means is also provided, as will appear, whereby the recessional movement of the wheel slide also starts the wheel truing device. The wheel is trued after finishing every shaft and while the work is being changed.

As stated, the pump 27 provides the hydraulic pressure by pumping oil from the reservoir 11 and distributing it through a pipe 50. This pipe delivers the oil under pressure to a two-way valve 52 which delivers in accordance with the setting of the valve to either of two jointed or flexible pipes 53 and 54 and of course the valve can move to neutral position. There are two of each of these.

The pipes 53 are adapted to deliver pressure to one end of each of the two cylinders 55 and 56 while the pipes 54 deliver to the other end of the same cylinders. In each of the cylinders, of course, there is a piston and the piston rods are provided with racks 57 and 58 respectively, each meshing with a pinion 59 or 60. These pinions are mounted on shafts provided with eccentrics 61 and 62. The eccentrics are mounted in bushings on a frame 63 which is adapted for the purpose of moving the shaft 51 longitudinally. This shaft is provided with two collars at its end which set into a box 64 carried by the frame 63 and secured in position by a cap 65 and bolts as shown in Fig. 6.

It will be noticed that the distance between the centers of the eccentrics 61 and 62 is the same as the distance between the center of the eccentric 62 and the center of the shaft 51. The eccentric 61 has a throw of twice the amplitude of the throw of the eccentric 62. Now it will be seen that if the cylinder 56 is supplied with oil under pressure on the right side to force the rack 58 to the left, it will turn the pinion 60 and the eccentric 62 through a half rotation.

At this time the frame 63 is fulcrumed on the eccentric 61. Therefore the shaft 51 will be moved axially a distance equal to twice the throw of the eccentric 62. On the other hand if the cylinder 55 is supplied with oil under pressure the frame 63 will now be able to oscillate about the eccentric 62 as a center and the shaft 51 will be moved in one direction just as far as the throw of the eccentric 61, that being twice the throw of the eccentric 62 the two motions of the shaft 51 will be equal. The first of these motions above described is for the purpose of turning the work 120° and the other for the purpose of turning it a second 120°.

Now by reference to Fig. 7 it will be seen that the shaft 51 is provided with a spiral gear 67 working in a nut 68. This nut is shown in the form of a separate steel piece which is driven in to the spindle 44 of the head-stock and it is also pinned or otherwise fastened so as to constitute a part thereof. It is made separately only for the purpose of economy and this thread is only practically a thread in this spindle.

The movement of the shaft 51 longitudinally therefore causes it to revolve relative to the spindle 44 actuating the chuck 34 by pinion 69 in mesh with pinion 42 thus carrying the work through the areas above mentioned for the purpose of turning the crank shaft to bring the next crank into grinding position. The end of the crank-shaft is received in a socket in the head-stock spindle which has a center 70 for receiving it and is held by the clamp controlled by the handle 37 as previously described. This, of course, is off center, the amount necessary for the particular crank-shafts being operated upon. This machine is designed to operate on a standard crank-shaft and there is no adjustment shown in the distance between the center of the center point 70 and the center of the headstock spindle 44.

At this time it might be noted that although this machine is designed for grinding crank-shafts it can be used for grinding their bearings or for ordinary grinding on centers and the head-stock is provided with a tapering centering recess 71 to be used in such a case. The spindle 44, of course, and head are operated by the pulley 32 keyed thereto and run by the motor 25 as previously stated. Between grinding operations the work is indexed around by the operation of the valve 52 which is automatic and which will be described later.

The pipe 50 is also provided with a branch valve 72 delivering oil under pressure to either of two pipes 73 and 74 which control a cylinder 75 and its piston operating the foot-stock to draw it back when the work is to be taken out and move it up when it is put in, the operations being similar. Two lines along the branch of the pipe 50 operate through a valve 80, the main cylinder 81 which is connected by its piston rod 081 fixed to the table 15 for operating the latter. This also is all arranged automatically as will appear. The pump 27 therefore operates the four cylinders 55, 56, 75 and 81, also the wheel slide cylinder 39.

The headstock spindle is driven from the motor 25. The head stock spindle and the foot stock spindle 85 are each provided with gears indicated at 86. These gears are of the same size. The gears 86 are connected respectively through intermediate gears with pinions 87 fixed to a longitudinal shaft 88. The rotation of the head stock will, therefore, impart rotation to the longitudinal shaft 88 and the rotation of this shaft 88 will impart rotation to the foot stock 85. This preserves the lineup of the two centers and insures their simultaneous and equal operation at all times and makes them both live centers.

The right hand end of the shaft 88 is hollow and splined or non-circular to receive a smaller shaft 89 adapted to slidably fit in the hollow end and of course, to be turned positively by the shaft 88 whenever the work is in motion. The shaft 89 transmits its rotation through a shaft 90 and bevel gearing 91 to a longitudinal shaft 92 in two parts connected together by a clutch 93 operated by a handle 94. When the two parts of the shaft 92 are clutched together the mechanism in the feed box 95 is operated for feeding the wheel slide as will appear.

Figure 15:
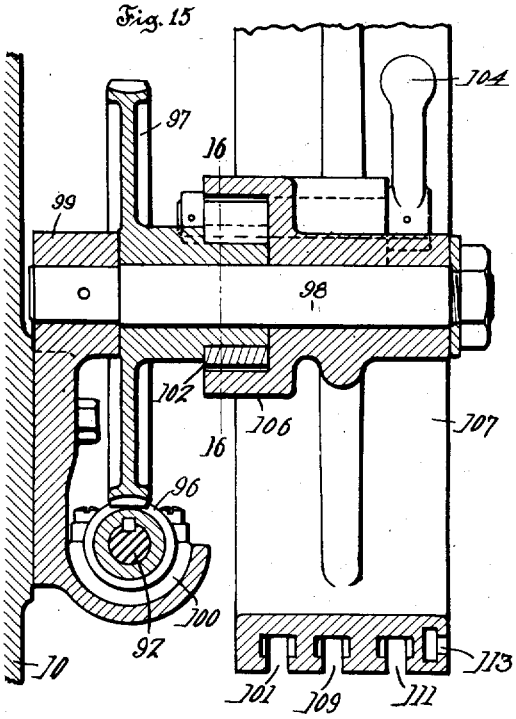
Fig. 15 is a sectional elevation showing the mounting of the worm, worm wheel and wheel upon which the cams are mounted.
Figure 16:
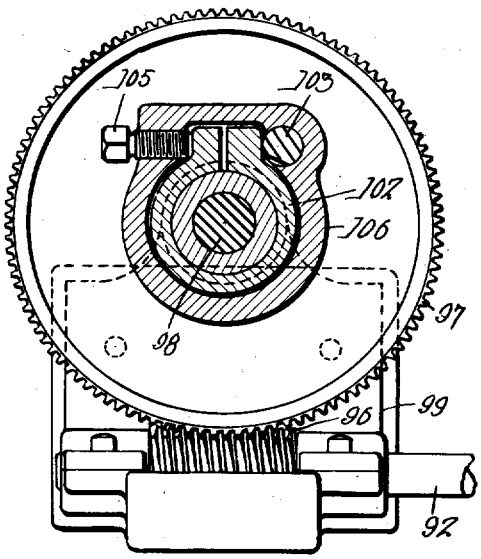
Fig. 16 is a sectional view on the line 16—16 of Fig. 15 showing the friction drive between the worm and cam wheels.
Figure 17:
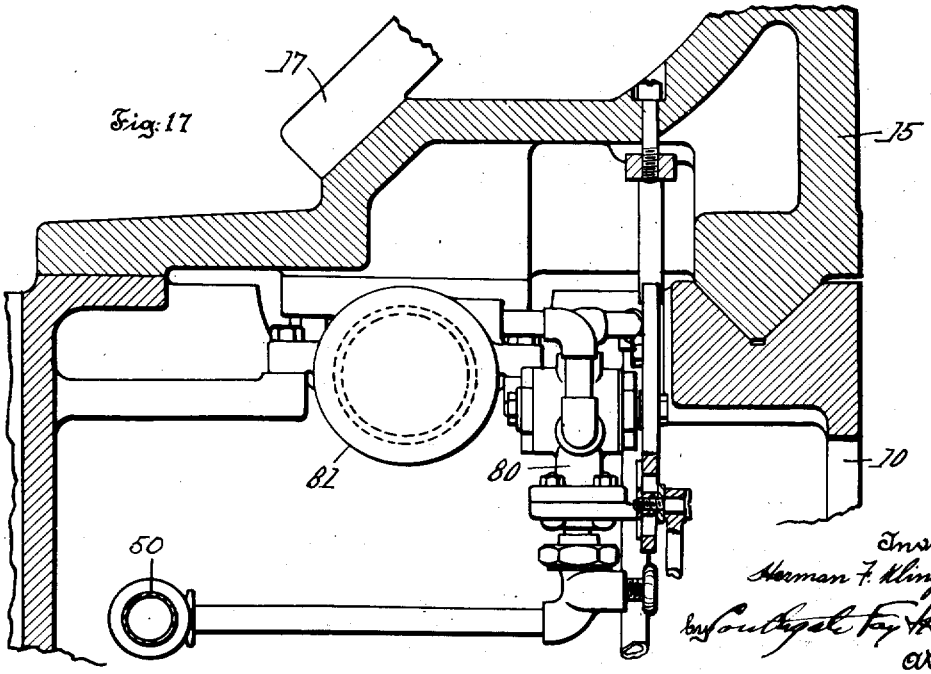
Fig. 17 is a sectional elevation on the line 17—17 of Fig. 1 showing the hydraulic cylinder that operates the table, the valve for the same and the stop that automatically stops the table at either end of its total allowable travel.

By means of a worm 96 rotation is transmitted from the shaft 92 to a worm gear 97 on a stud 98 (see Figures 15 and 16). This stud is shown as having a bearing at one end only in a bracket 99 secured to the frame 10 and as having an oil pocket 100 under the worm. The worm wheel 97 is not fixed to the stud but the stud is fixed to its bearing so as to be stationary. The hub of this wheel 97 is provided with a split collar 102 around it which can be clamped to the hub by an eccentric 103 having an operating handle 104. A screw 105 is shown on the opposite side for adjusting purposes.

The screw 105 and eccentric 103 are mounted in an enlargement 106 on the hub of a cam wheel 107. Therefore when the parts are in the position shown in Fig. 16 the worm wheel and cam wheel are fixed together to rotate on the stud and when the cam 103 is released the worm wheel can rotate without rotating the cam wheel. This cam wheel is provided in the present instance with four grooves for receiving cams. In each of these grooves there are six of these cams around the circumference, when the machine is set up for a six cylinder crank shaft. In the groove 101 are cams 108, Fig. 28, which control the steady rest. In the groove 109 are cams 110 which operate and control the main cylinder by means of the space bar therefor, as will appear. In the groove 111 are cams 112 for controlling the operation of the two cylinders 55 and 56 to change the angle of the crank shaft. In the side groove 113 are cams 114 which control the operation of the wheel slide.

The cams 114 engage and operate an arm of a lever 115. This lever is connected by a link 116 and three armed lever 117 with the parts to be operated. One of these arms reciprocates a rod 118 which extends to the right in Figs. 1, 2 and 3 and in its reciprocations operates a pair of dogs 119 and 120 for controlling the connection of the shaft 92 with the wheel slide.

The shaft 92 is provided with a pair of opposite bevel gears 122 adapted to operate a bevel gear 123 in either direction. Connected with this latter bevel gear is a gear 124 driving a gear 125 on a stud carrying another gear 126 which meshes with a gear 127 that is in mesh with a gear 128. On the outside of the fine feed control of the wheel slide, the stud carrying the gears 125 and 126 is adjustable by being mounted on a swinging arm 129 having a slot connection 130 so that these gears 125 and 126 can be exchanged for gears of different sizes to get any desired speed ratio.

The control of the connection of the shaft 92 with the gear 123 is provided through a yoke 132 entering a clutch collar 133 for clutching either one of the gears 122 to the shaft 92 or free both of them. This is a spring controlled yoke having springs 134 opposing each other and a collar 135 operated by a tooth 136, as will appear. This tooth is mounted on a lever 137 which extends beyond its pivot and can be operated by hand in the preliminary process of setting up the machine. A lever carries the two dogs 119 and 120, which are adjustable for obvious purposes, and the link 118 is provided with an elongated slot 138 to give a little play in connection with its operation with one of these dogs.

The lever 137 is pivoted at 140 on the frame. The yoke structure 132 is provided with collars 141 on the two ends which constitute stop surfaces and a pair of latches 143 are provided having abrupt transverse surfaces 144 adapted to come behind these collars 141 which, when either one of them passes a little way inwardly from the position shown in Fig. 2, prevents further motion backwardly. These latches are released by the motion of the lever 137 about its pivot operating cam surfaces on their ends.

It will be seen therefore that when the link 118 is moved over far enough to take the dog 119 backwardly it swings the lever 137 to the right below its pivot. When it is moved in the opposite direction it will swing this lever in the opposite direction. These two dogs 119 and 120 are adapted to be actuated by cams 146 and 147 on the hand wheel 148 on which the gear 128 is mounted. This hand wheel is mounted to turn on the axis of the shaft carrying the screw 40 but is mounted on a shaft 150 set into the hollow end of the screw shaft. The shaft 150 carries, keyed to it, a gear 151 which meshes with a pinion 152 fixed with respect to a pinion 153. These two pinions are mounted on a stud 154*a* loosely and this stud is carried by the hand wheel 148. The two pinions are of about the same size but have different numbers of teeth, one having several teeth more than the other.

The pinion 153 meshes with a circular rack 154*b* which, by means of bolts 155*b*, is fixed to the frame 10 of the machine and therefore is stationary. The result of this construction is that the rotation of the gear 128 is transmitted to the shaft 150 at a very low rate of speed and from that shaft to the screw 40 as the shaft 150 is keyed to the shaft of that screw. The gear 128, in the form shown, makes one complete revolution to .0606 of a revolution of the shaft 150. This gives .022" travel to the wheel slide. Thus the feed of the wheel slide 18 is provided for, both automatically and by hand, as the hand wheel 148 is provided with a handle 157 for adjusting the parts in setting up the machine. The wheel slide 18 has a downwardly extending bracket to which is pivoted the end of the piston rod of the cylinder 39. The screw is completely fitted to the bearing, which is split on the horizontal plane, the lower half being hinged on one side and bolted firmly in place on the other (see Fig. 35). In this way there will be no tendency to lift the wheel slide, or press the screw down, as is the case when a half nut is used with anything but a square thread. By simply releasing the bolt, the cap will hang down and the wheel slide can be bodily raised or lowered into place.

As the two cams 146 and 147 come around and 146 operates the dog 120 with the lever on which both are mounted, the feed is stopped, being thrown into neutral, the position shown in Fig. 2, where it remains until the wheel slide starts to recede, the three armed lever 117 acts, and the short arm by the link 118 will pull the lever controlling feed gear into reverse. The feed gear is now reversing while the other changes are taking place, and it will so continue until the cam 147 adjustably fastened to the side of the stop feed cam just described, throws it out of gear into neutral. Then when the wheel slide is again brought forward, the three armed lever this time acting in the opposite direction will throw the gear into feed, and fine feeding will be well on its way before the feed screw comes up against the shoulder 1511.

Obviously the setting of these two dogs and especially the setting of the two cams 146 and 147 will control the time of the start of the fine feed of the wheel slide and the time of its stoppage and reverse. After reversal of course the wheel slide comes to a stop. The rotation of the shaft 150 acts to bring the end of the screw shaft 40 firmly up against a shoulder 1511, a ball bearing thrust collar being located between them. At this point the grinding wheel just clears the work. It is brought to this position by the cylinder 39, the action of which is stopped at this point by the cam 114 and at once opened up again automatically to create full pressure tending to move the wheel slide forward. Just a little before this the fine feed starts automatically.

The feed wheel 148 carrying the handle is mounted with a running fit on the shaft 150. The end of the shaft 150 is keyed so that the screw may always be driven by this shaft.

As the grinding wheel gets smaller after every truing operation, the position of the shoulder 1511 is brought nearer the front of the machine for a distance exactly equal to the amount removed in truing. This is done by operating on a ratchet gear 154 as the correct position is on the horizontal plane. The gear 154 is connected to the outer end of the shaft 155. On the inner end of this shaft is a gear 156 which meshes with a gear 1157 formed as an integral part of the sleeve 1158 having a thread cooperating with a threaded nut 159. Every tooth taken up by the ratchet permits the slide to move .001 inch nearer the front and thus preserve the correct finishing position of the wheel. As the shafts come to this machine from a similar machine doing the rough grinding the pins would all be .025'' or .030'' large. This being so, it would only require about seven tenths of a revolution of the hand wheel 148 to advance the slide sufficiently to attain the finish diameter.

The next operation, it will be understood, is the shifting of the crank shaft through at an angle of 120° or whatever is necessary for the particular crank shaft and these six operations just described take place over again.

When the three-armed lever 117 is moved inwardly at its outer or longer end it operates a link 1571 which is adjustable by a turn buckle. This link operates a valve 1158 which controls the admission of oil under pressure to the cylinder 39 at either end and applies hydraulic pressure to the wheel slide. The object of this, as has been stated, is to operate the wheel slide by hydraulic pressure but to control it by the screw 40.

It may be stated at this point that on the cam wheel 107 there is one cam 160 which acts as a stop cam to stop the machine after a complete cycle of operations for the purpose of finishing all the cranks on the crank shaft. This operates a lever 161 when the time comes. On this lever there is an arm 162 which, when the cam operates, the lever opens an electric contact 41 in the circuit of the motor 25 and stops the motor.

At the same time the lever 161 actuates an arm 166 which has a tooth 167 thereon for engaging the ratchet wheel 154 and turning it one tooth every time the machine is stopped. This, through the gearing 156 and 1157 described above, advances the wheel slide a very small distance, as for example, one thousandth of an inch, after each complete series of operations. This is for the purpose of compensating for the amount of material taken off the grinding wheel in grinding the six cranks, thereby insuring that the next grinding operation will be performed at substantially the same distance from the center within a very small variation, which is allowable in this class of work.

Figure 18:
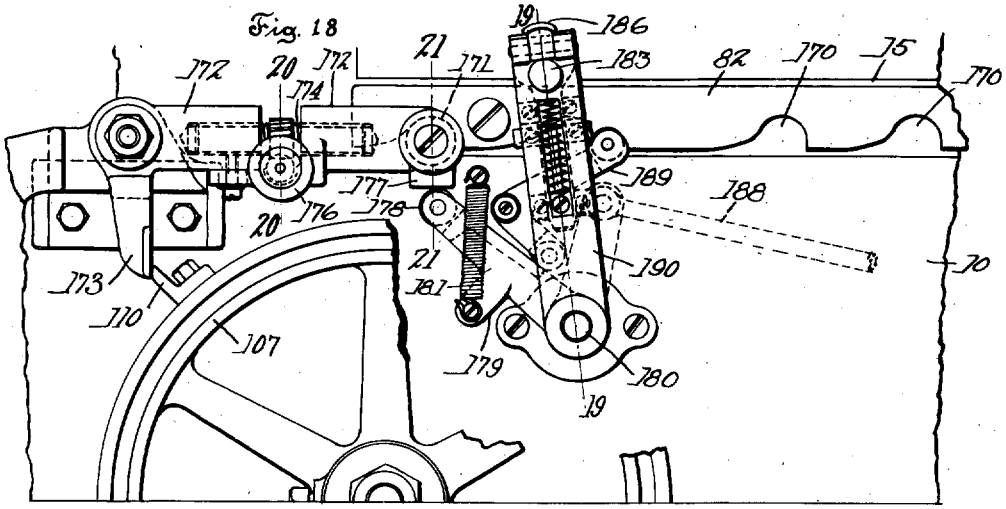
Fig. 18 is a front view of the mechanism controlling the movement of the table, showing the table stop cam, part of the spacing bar and the lever controlling the valve that operates the table.
Figure 19:
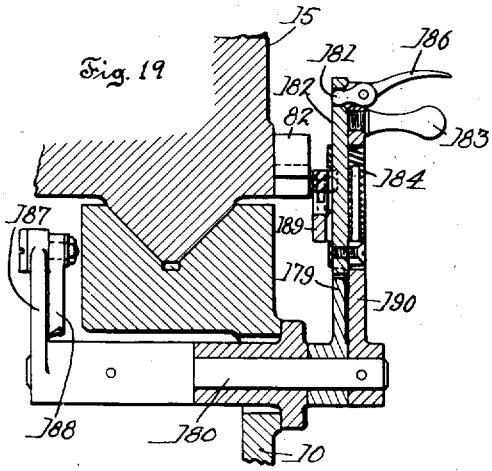
Fig. 19 is a section on the line 19—19 of Fig. 18 through the hand lever.
Figure 20:
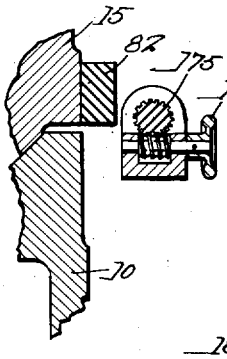
Fig. 20 is a section on the line 20—20 of Fig. 18 through the adjustable feature of the stop.
Figure 21:
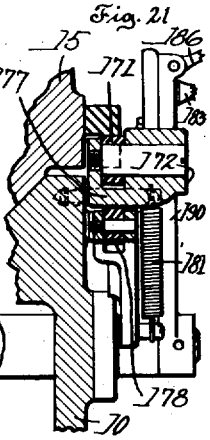
Fig. 21 is a section on the line 21—21 of Fig. 18 showing the rolls on the stop and lever.
Figure 29:
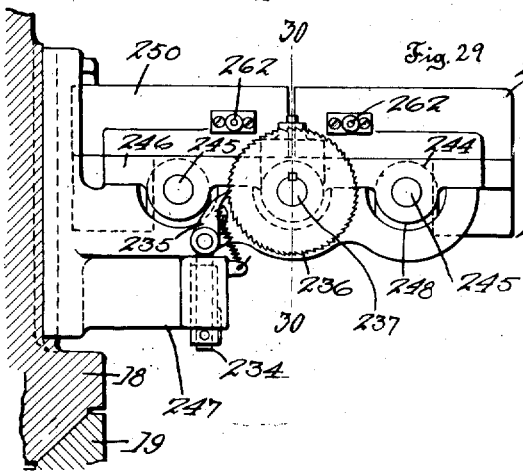
Fig. 29 is a rear view of the truing bracket bolted to the wheel slide.
Figure 30:
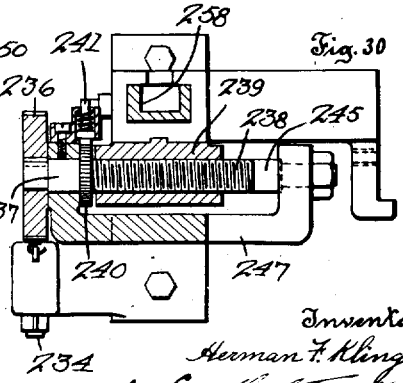
Fig. 30 is a cross section of the truing bracket on the line 30—30 of Fig. 29 showing the ratchet gear and screw that moves the truer as much as has been removed in truing.

The table 15 carrying the head stock and foot stock is moved forward by the hydraulic cylinder 81 and it is controlled by the spacing bar 82 which has a series of seats or notches 170 for controlling the duration of the forward movements. This bar is urged to the left in Fig. 18 by the cylinder 81 and a roll 171 on a stop lever 172 is located in one of the notches 170, stopping the bar and table for the time being. When one of the cams 110 on the cam wheel 107 engages the nose 173 of the stop lever 172 it pushes down the roll 171 out of its notch.

The upper horizontal arm of the bell-crank 172 is made in two parts, and adjustably connected together by a double screw 174 operated by a worm and gear 175. The worm is on a shaft provided with a hand wheel 176 by which it can be adjusted in length.

On the outer end of the bell-crank 172 is a projection 177. When the bell-crank comes down to bring the stud 171 out of the notch 170 this projection engages a roll 178 on an arm 179 free on a shaft 180. A spring 181 holds this arm up in the position shown in Fig. 18, but of course yields to allow it to descend.

Keyed on the shaft 180 is an arm 190 having a latch 182 and a handle 183, the latch being forced downwardly by a spring 184 on the arm. This arm 190 is connected by the latch with the arm 179 which has a notch for that purpose. The arm 190 has the latch 182 operated by a lever 186 and cooperating with the handle 183 for moving the latch outwardly by means of a roll 181, the latch entering the notch in the end of the arm 179 and normally makes it move with the arm 190.

When the time comes to advance the table for the purpose of grinding the next pin, the cam 110 throws out the stop lever 172 which in turn swings the shaft 180 and the arm 190, which is connected with the arm 179 by the spring latch 182, so they both move. Thus the shaft 180 is turned, and by means of a crank 187, secured on its end inside the base of the machine, and a link 188, opens the valve 80 connected with the cylinder 81 which operates the table. For all of the pins the valve is opened and closed to move the table to the left only. The valve remains open until the roll 171 slides into the next seat 170 in the spacing bar. Then the valve closes.

It will be understood that these seats or notches are spaced at distances exactly equal to the spaces between the centers of the crank pins on the work. The length, from the end of the shaft being worked on, to the center of the first pin is usually standardized, but the location of the pin longitudinally on the machine varies slightly on account of the shaft being hung on the centers and the depths of the center countersinks lacking uniformity.

After all the pins are ground and the machine is stopped automatically by the stop cam 160, it is necessary to move the table the whole distance to the right so as to be in position for grinding the first pin on a new piece of work. By grasping the handles 183 and 186 and lifting the latch 182 the arm 190 is freed from the arm 179 and the operator can move the table at will in either direction without moving up the lever 172. As the handle is moved to the right for the purpose of moving the table to the right it contacts with a knee lever 189 and depresses the lever 179 that lifts the stop bar 172. This allows the stop bar to drop and prevents its bounding in and out of the notches as the spacing bar passes until the table is stopped. Then the roll 171 is allowed to move into the first notch of the spacing bar.

It may be stated here that only five of the cams 110 are required, spaced 60° apart and 60° from the stop cam 160. The last cam 110 is not needed because of the stop cam 160 which stops the table and machine as above explained after the last pin is ground.

The steadyrest 36 is bolted to the base of the machine in transverse alignment with the center of the grinding wheel and it has sliding contact with the table so that the table can move without moving the steadyrest. The cams 108 on the cam wheel 107 operate a lever 191. This lever is arranged to operate an adjustable rod 192, bell crank 193, links 194 and arms 195 on a shaft 196. On this shaft is an arm 197 having a roll 198 which engages a plate 199 on the back of the steadyrest proper 200.

When the arm is moved in one way it will push the roller down and allow the steadyrest to descend on an arc about a pin 201. In Figs. 26 and 28 the position at the start of grinding is shown in full lines. As the grinding process proceeds the cam advances gradually until the high point is reached, that is, when the grinding is finished. Now a slight dwell on the cam comes into action on the lever 191, and continuing the cam depresses the lever, thus allowing the steadyrest to move down out of the way to permit the work to pass without interference. The steadyrest cams like the other cams on the wheel 187 are spaced 60 apart. Thus the steadyrest will be raised or lowered at the right time for engaging each pin opposite the grinding wheel. It will be understood that the steadyrest is lowered at the same time that the wheel slide is moved back.

With this machine I provide a stone truing device located on the back of the machine out of the way and permanently attached thereto so that it does not have to be applied and removed whenever the stone is to be trued. It has been stated herein that the wheel slide is advanced one thousandth of an inch after all the crankpins of each shaft have been trued. Of course, it is not essential that this be one thousandth of an inch but that has been adopted as being a convenient amount.

In order that each shaft shall be started with the stone in a position to grind the crankpins of the same size on all shafts, I provide the truing device arranged to remove one thousandth of an inch from the stone after each shaft is completed. By that I mean that the stone is trued down to a total reduction of one thousandth of an inch after the several grinding operations are performed on a single shaft. Of course, something is removed in the grinding and the truing device removes the remainder of one thousandth of an inch, if that is the amount decided upon.

For that reason the wheel slide can be moved up exactly the right amount after each shaft has been completed. It has been customary to true the stone after three shafts are completed, that is, after eighteen grinding operations on a six cylinder shaft and it has also been customary to apply the truing device to the grinding machine at that time and then remove it before the next shaft is put in and ground. In this case the truing device remains on the machine all the time and preferably is brought into operation automatically to true the stone after six grinding operations, if it is a six-cylinder shaft that is being operated upon. In this way absolute accuracy is obtained and there is not a great deal for the truing device to do. Furthermore, this truing device operates to true the two corners of the stone and the face of it during a single operation and while the work is being removed and replaced so that it does not take up any time that could be saved in any way.

This truing device acts to true the corners of the wheel to the exact radius called for by the fillets of the crank-pins and it is readily adjustable so that whatever radius these fillets have can be taken care of by this truing device without anything but a very simple adjustment. It is also adjustable in a very simple manner to take care of crank-pins of different lengths and consequently stones of different widths. It can easily be adapted to true the wheel to greater or lesser amounts and with greater or less frequency than has been mentioned.

Of course, the wheel being trued up grows smaller and automatically the truing device is moved up to provide for this and can conveniently have a range on an ordinary size machine of two inches so that a wheel can be reduced four inches in diameter automatically and without adjustment except that obtained automatically. Then a new wheel has to be put in.

The truing device is mounted on the wheel slide 18 to move with it. The base frame 247 of the truing device is bolted to the wheel slide 18 and supports a flat shoe or slide 246, provided with three bosses, the center one being the nut 239. The other two bosses 244 receive guide pins 245 and constitute supports for rigidly holding the shoe 246 which supports the whole truing device. The base frame 247 is provided with three recesses 248 which receive these three bosses 239, 244 and 244 to provide clearance between them. The two guides 245 are supported by the base frame 247 and give rigid support to the shoe 246 at all points of its travel.

The feed of the truing device, independent of the wheel slide, is performed hydraulically by a cylinder 210. This cylinder is supplied with oil under pressure at its two ends by pipes 211 which are joined to allow for the adjustment. The supply of oil is controlled from a valve 212 which is adapted to be operated to introduce oil under pressure to the two ends alternately. Every time the wheel slide 18 moves back, a ratchet pawl 213 engages a tooth of a ratchet wheel 214 mounted on a shaft 215. On this shaft is another wheel 216 having notches and a lever 218 has a roll 219 and is pressed by a spring 220 against the wheel 216. Thus, after each operation of the wheel slide, the wheel 216 and consequently the shaft 215 is held in fixed position. When the wheel slide is operated six times, in the present case, a cam 221 fixed on the wheel 216 engages the end of a lever 222 and oscillates that lever. This has two effects. In the first place this is a three arm lever and connected with one arm is a link 223 which operates the valve 212 and allows oil under pressure to enter the cylinder 210 at one side to operate the piston therein.

Another arm of the lever is connected by a link 224, which is adjustable by means of a turnbuckle 225, and swings a bell crank 226. This bell crank constitutes a stop against a plate 227 which is movable with the piston rod 228 of the cylinder 210. At this time it moves the stop so that this plate will engage it towards the end of the stroke when the cylinder operates.

Movable with the cam 221 is another cam 230 one step ahead of it. This cam operates a lever 231 similar to one arm of the lever 222. One arm of this lever is connected by a link 232 with a plate 233. This plate is moved up by this cam so as to come into contact with the end of a plunger 234 which is pressed down by a spring and pressed up by this plate to cause a spring pawl 235 to engage a ratchet wheel 236 and advance it the distance of one tooth. This ratchet wheel is fixed on a shaft 237 provided with a screw thread 238 operating in a nut 239 constituting a part of the frame of the truing device. The frame is advanced one thousandth of an inch, in the present instance, for each operation of the pawl 235.

This shaft 237 is also provided with a notched wheel 240 engaged by a spring-pressed stop 241. There are just as many teeth on the wheel 240 as there are on the wheel 236 and this pawl 241 is designed to stop the screw 238 and insure that it will stop in the right place for the wheel 236 to be in the right position and be operated at the same distance at the next operation of the pawl 235.

The piston rod 228 of the cylinder 210 is provided with a parallel rack 251 movable with it and meshing with the pinion or gear 252. The parts are so designed that the double travel of the piston in the cylinder 210 will result in a half revolution of the gear 252 back and forth. This gear is fixed on a stud 253 which carries an arm 254 having a forked end. The forked end of this arm engages a block or diamond holder 255 which is mounted to slide in a quadrant path formed in one of the path castings 250. These two castings are bolted on the shoe 246 and, being made in two pieces, they can be adjusted and bolted the right distance apart. The curved part of each casting is provided with a grooved T-slot to receive the diamond holder 255. The center of the slot has a radius centered about which the corner of the grinding wheel is described. On each inner end the two path castings are planed to fit the sliding block 258.

As the arm 254 turns and takes the block 255 with it through an angle of 90° on the path casting 250, at the bottom of Fig. 32, it then comes to the straight part of the path casting. Now it moves in this straight path and is guided by a sliding block 258 after completing its curved path. Then it moves along a straight path into the other casting 250 and finally through the quarter circle at the end of that casting.

This arrangement is provided so that the diamond point dressing the wheel will dress off the corners. The two arcs of the path castings 250 provide for the dressing of a wheel on a quarter circle and the diamond point is arranged at a proper distance from the center 253 to provide the desired curvature. The two castings are placed far enough apart so that the straight part of the block 258 will just provide for truing the grinding wheel throughout its face.

It will be noticed that on the block 258 is pivoted a dog 260 at each side and in the path castings 250 there are grooves 261 having a certain extent. When the diamond holder moves into engagement with the block 258 after completing its curved path, the dog 260 on one side having dropped into a groove 261, Fig. 34, at the end of the straight path, it engages the dog 260 at the other end and then the block 258 and the diamond holder move along in a straight line to the end of the straight path. At that point the dog in action drops down and the diamond holder will continue to move in a different path, namely in the curved path of the other path casting 250. The block 258, remaining in the position in which it is left, is held in place by a give-way plug 262 located one at each end of the straight path in which it moves.

It will be understood that this series of operations results in moving the diamond point around the corner of a stone through an angle of 90° while truing and then across the stone and around the opposite corner 90°. When the piston 228 moves in, the dog 227, attached to the underside of the rack, contacts with the lever 226 thus reversing the valve 212 and causing the piston to reverse. This brings the diamond back to its original position as shown in Fig. 32.

It will be seen therefore that the diamond travels a complete truing distance once and back during each operation. The amount of feed of hydraulic fluid can be regulated by the valve so as to flow for a quick or slow speed of the diamond. Ample time may be given to secure the best results, as the truing operation occurs while the machine is at a standstill for loading and unloading purposes.

It will be seen that all the advantages above described are secured by this machine.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:

1. In a machine for grinding the crank-pins of crank-shafts, the combination of a table for supporting the crank-shaft to be ground, a grinding wheel, means for constantly rotating the grinding wheel, and means for indexing the crank-shaft around for bringing the different crank-pins in position for grinding, of a cylinder and piston connected with the table for moving it lengthwise, pistons and cylinders connected for indexing the crank-shaft around, a pump and means connected with said pump for supplying the cylinders with liquid under pressure to move the pistons therein for the purposes described.

2. In a grinding machine, the combination of a table for supporting the article to be ground, a grinding wheel, means for constantly rotating the grinding wheel, and means for indexing the crank-shaft around for bringing the different crank-pins in position for grinding, of a cylinder and piston connected with the table for moving it lengthwise, a grinding wheel slide, a piston and cylinder for operating the grinding wheel slide toward and from the work, pistons and cylinders connected for indexing the crank-shaft around, an oil pump and means connected with said oil pump for supplying the several cylinders with oil under pressure to move the pistons therein for the purposes described.

3. In a machine for grinding the pins of crank-shafts, the combination with a reciprocable table, of a head-stock and foot-stock thereon for supporting and turning the work, a spacing bar carried by said table having a series of seats therein arranged at suitable distances apart to control the operation of the table, a cam wheel, a series of cams thereon, one for each angle between two crank-pins, and a lever having one arm in position to be engaged by said cams and having means on the other end adapted to engage in said seats to stop and hold the spacing bar and also the table.

4. In a grinding machine, the combination with a table having means for supporting the work to be ground, a grinding wheel, a spacing bar adapted to be fixed with respect to the table and having seats therein, a lever having a roll for entering said seats and stopping the table and holding it in fixed position, one arm of said lever having a double screw and aw orm-wheel thereon, and a hand-wheel having a worm for operating the worm-wheel and adjusting the length of the arm of the lever.

5. In a grinding machine, the combination with a table having means for supporting the work to be ground, a grinding wheel, a spacing bar adapted to be fixed with respect to the table and having seats therein, a lever having a roll for entering said seats and stopping the table and holding it in fixed position, a cam wheel having a series of cams thereon for engaging the other arm of the lever and moving the roll out of its seat, a cylinder having a piston connected with said table for operating it, means for introducing liquid into said cylinder for moving the table forward to bring the spacing bar into position for cooperation with the roll from one seat to the next, and means whereby when the roll is brought out of its seat the application of fluid to said cylinder will be turned on.

6. In a grinding machine, the combination with a table for supporting the work to be ground and a spacing bar carried by said table and having seats therein at desired intervals, of a cam actuated lever having a roll for entering said seats, one at a time, and stopping the bar and table, a pivoted arm adapted to engage the end of said lever and to be pushed away by it when the roll is moved out of its seat, a cylinder having a piston connected for operating the table, means normally connected with said arm for allowing liquid under pressure to enter said cylinder on the side to move the table forward when the roll moves out of its seat, a hand-lever adapted to be moved back and to operate said connections for introducing liquid on the other side of the piston in the cylinder to move the table back, a latch connection between the hand-lever and the arm, manual means for releasing the latch when the table is to be moved back, and means operated by the hand-lever for forcing the arm away from the first-named lever to prevent said arm forcing the roll back into the seats in the spacing bar as the table is moved back.

7. In a grinding machine, the combination with a table having means for supporting the work to be ground, a grinding wheel, a spacing bar adapted to be fixed with respect to the table and having seats therein, a lever having a roll for entering said seats and stopping the table and holding it in fixed position, a hand lever having a connection by which it is adapted to reverse the cylinder by operation of its valves when the hand-lever is turned in one direction, an arm pivoted on the same axis and fixed with respect to the hand-lever through which said roll operates the valves to stop the introduction of liquid into the cylinder, and means operated by said hand-lever when actuated to move the cylinder back for bringing said arm out of the way, whereby the roll will not be forced back into the several seats as they pass it when the table is moving back.

8. In a grinding machine, the combination with a table and a head-stock thereon having an eccentric center, of a central spindle adapted to move longitudinally, a spiral gear on said spindle, a nut fitting said spiral gear, means for turning said nut to advance and retract the central spindle in an axial direction, and means carried by the central spindle for operating the eccentric center for indexing purposes.

9. In a grinding machine, the combination with a reciprocable table, a hydraulic cylinder for operating the table, mechanical means for stopping the table at intervals in its forward travel, means operated by said mechanical means for shutting off the pressure from the cylinder, a head-stock fixed on the table, a foot-stock movably mounted on the table, a hydraulic cylinder adapted to operate the foot-stock center in an axial direction, means for supplying liquid under pressure to both of said cylinders, and a valve for controlling the admission of oil for each cylinder.

10. In a crank-shaft grinding machine, the combination with a table, head-stock and foot-stock for supporting the crank-shaft to be ground, each having a spindle, a grinding wheel and means for indexing the crank-shaft around from one crank-pin to the next comprising a pair of hydraulic cylinders, means for supplying oil under pressure to the cylinders to advance their pistons in either direction, a lever, means connected with said lever for turning the crank-shaft a portion of a revolution, racks connected with the pistons of said cylinders, gears or pinions operated by said racks, and shafts on the lever on which said gears or pinions are mounted, said lever having passages therethrough for receiving said shafts and also having a shaft connected with the headstock, means whereby the movement of the shaft longitudinally will rotate the head-stock spindle, said lever having a bearing for said shaft, the distance from the center of said shaft to the center of the shaft of one of said gears being equal to the distance between the shafts of the two gears, whereby when the most remote cylinder is not working and the second cylinder is working, the head-stock shaft will be moved a distance equal to twice the stroke of the piston of the intermediate cylinder and when the second or intermediate cylinder is not working and the more remote cylinder is working, the head-stock shaft will be moved a distance equal to the stroke of the more remote cylinder.

11. In a crank-shaft grinding machine, the combination with a table, head-stock and foot-stock for supporting the crank-shaft to be ground, each having a spindle, a grinding wheel and means for indexing the crank-shaft around from one crank-pin to the next comprising a pair of hydraulic cylinders, means for supplying oil under pressure to the cylinders to advance their pistons in either direction, a lever, means connected with said lever for turning the crank-shaft a portion of a revolution, racks connected with the pistons of said cylinders, gears or pinions operated by said racks, shafts on which said gears or pinions are mounted, said lever having passages therethrough for receiving said shafts, a shaft connected with the head-stock having a spiral gear thereon, the head-stock having a spiral nut fixed thereto meshing with the gear, whereby the movement of the shaft longitudinally will rotate the head-stock spindle, said lever having a bearing for said shaft, the distance from the center of said shaft to the center of the shaft of one of said gears being equal to the distance between the shafts of the two gears, the spiral gear being so arranged that when the intermediate cylinder operates, the crank-shaft will be turned one hundred twenty degrees, whereby when the more remote cylinder operates, the crank-shaft will be turned through an arc of another one hundred twenty degrees.

12. In a grinding machine, the combination with means for supporting the work to be ground, means for rotating it, a grinding wheel slide, a grinding wheel mounted on said slide, means for rotating the grinding wheel constantly, a hydraulic cylinder connected with said grinding wheel slide and tending constantly to advance it toward the work, a screw also connected with said grinding wheel slide, and means for rotating said screw at a very slow rate of speed to control the action of said cylinder and feed the wheel toward the work at a controlled speed of a controlling device for the screw comprising a gear and a ratchet motion for operating said gear slowly, said gear having a shoulder against which the end of the screw bears when the grinding wheel is brought into position to touch the work.

13. In a grinding machine, the combination with means for supporting the work to be ground, means for rotating it, a grinding wheel slide, a grinding wheel mounted on said slide, means for rotating the grinding wheel constantly, a hydraulic cylinder connected with said grinding wheel slide and tending constantly to advance it toward the work, a screw also connected with said grinding wheel slide, and means for rotating said screw at a very low rate of speed to control the action of said cylinder and feed the wheel toward the work at a controlled speed, of a controlling device for the screw comprising a rotary element, a differential therein, a shaft connected with said differential to rotate at a very slow speed, a sleeve on said shaft having a gear thereon, and a ratchet motion for operating said gear slowly, said gear having a shoulder against which the end of the screw bears when the grinding wheel is brought into position to touch the work.

14. In a grinding machine, the combination with a table and means for supporting the work, means for rotating the work on the axis about which the grinding operation is to take place, a grinding wheel, a wheel slide on which the grinding wheel is mounted, a steady-rest for the work, means for operating the wheel slide, steady-rest and table, a cam wheel and a plurality of series of cams on said cam wheel arranged to control the respective operations of the steady-rest, table and wheel slide.

15. In a grinding machine, the combination with a table and means for supporting the work, a grinding wheel, a wheel slide on which the grinding wheel is mounted, a steady-rest for the work, hydraulic cylinders for operating the wheel slide and table, a cam wheel and a plurality of series of cams on said cam wheel arranged to control the operation of the several hydraulic cylinders for operating the table and wheel slide, means for indexing the work around to bring one eccentric part of it after another in position for grinding, said means comprising two cylinders and connections whereby the operation of said cylinders will turn the work on an axis eccentric to the cylinder being ground, and means for introducing fluid under pressure into the two cylinders in the desired order.

16. In a grinding machine, the combination with a table and means for supporting the work, means for rotating the work on the axis about which the grinding operation is to take place, a grinding wheel, a wheel slide on which the grinding wheel is mounted, a steady-rest for the work, hydraulic cylinders for operating the wheel slide and table, a cam wheel and a plurality of series of cams on said cam wheel arranged to control the operation of the several hydraulic cylinders for operating the table and wheel slide.

17. In a grinding machine, the combination with a table having means for supporting the work, a grinding wheel adapted to be rotated constantly, a wheel slide carrying the grinding wheel, a hydraulic cylinder for operating the wheel slide toward and from the work, means for controlling the feed of the grinding wheel by the cylinder, a hydraulic cylinder for operating said table, means for controlling the latter hydraulic cylinder, and means independently mounted on the machine for truing the face and corners of the grinding wheel said last-named means being automatically operated when the wheel slide is drawn back a predetermined number of times.

18. In a grinding machine, the combination with a table having means for supporting the work, a grinding wheel adapted to be rotated, a wheel slide carrying the grinding wheel, and means independently mounted on the machine for truing the face and corners of the grinding wheel every time the wheel slide is drawn back for the purpose of allowing the work to be removed and replaced, said means comprising a pair of plates each having an arcuate groove of about a quarter of a circle and a straight portion, said plates being mounted so that their straight portions are in alignment and being adjustable toward and from each other for different sized wheels, a truing element movable along said grooves through an arc of 180°, thus providing for truing first one corner of the wheel and then moving it across the face and truing that and then truing the other corner, a hydraulic cylinder, and means connected with said hydraulic cylinder for moving the truing tool through the course described.

19. In a truing device for a grinding wheel, the combination of a pair of plates each having a cam groove curved on an arc of substantially 90° and a continuation thereof at one end tangent thereto, said plates being right and left handed and being placed with their tangents in alignment and being adjustable toward and from each other, a block located under said plates at the point where they come nearest together to bridge the space between them, a truing tool guided to move in said grooves, means for moving said truing tool from a point at the extreme edge of one plate to a point at the extreme edge of the other through an arc of 180°, whereby the truing tool will first true off one corner of the stone throughout a quarter circle and will then move across the face of the stone and true it and then true off the opposite corner to an arc of 90°.

20. In a truing device for a grinding wheel, the combination of a pair of plates each having a groove therein, a truing device mounted to move in said grooves, the two plates being arranged right and left hand and spaced apart, a sliding block between them, means for moving the truing tool along said grooves throughout an arc of 180° to bring it around the corner of the stone, across its face, and around the other corner, a pivoted dog on each side of the block, said plates having grooves for receiving said dogs shaped so that when the truing tool holder passes into the space between the plates it will engage one of said dogs and cause the block and tool holder to move as one in straight line to the end of the straight path and so shaped that the dog drops down allowing the holder to continue to move along the curved path of the other plate and the sliding block to be stopped at the end of the straight path.

21. In a grinding machine, the combination with a wheel slide, means for moving the wheel slide back and forth to start and finish a grinding operation, a grinding wheel carried by the wheel slide, a ratchet wheel having a plurality of notches therein, a pawl on the wheel slide for operating said ratchet wheel at each reciprocation of the slide, a cam tooth carried with the ratchet wheel, a lever in position to be operated by the tooth at a predetermined time, a wheel truing device, a hydraulic cylinder, means controlled by said lever for allowing fluid under pressure to enter the hydraulic cylinder, means operated by the hydraulic cylinder for moving the truing tool to true off the grinding wheel.

22. In a grinding machine, the combination with a wheel slide, means for moving the wheel slide back and forth to start and finish a grinding operation, a grinding wheel carried by the wheel slide, a ratchet wheel having a plurality of notches therein, a pawl on the wheel slide for operating said ratchet wheel at each reciprocation of the slide, a cam tooth carried with the ratchet wheel, whereby when the ratchet wheel has been turned through an arc a predetermined number of times, the tooth will complete a revolution, a lever in position to be operated by the tooth when the revolution is completed, a wheel truing device, a hydraulic cylinder, means controlled by said tooth for allowing fluid under pressure to enter the hydraulic cylinder, means operated by the hydraulic cylinder for moving the truing tool to true off the grinding wheel, and means connected with said lever for operating it, located in position to be moved by the piston and the cylinder when it reaches the end of the stroke, for cutting off the fluid from one end of the cylinder and turning it into the other end.

23. In a grinding machine, the combination with a wheel slide, means for moving the wheel slide back and forth to start and finish a grinding operation, a grinding wheel carried by the wheel slide, a ratchet wheel having a plurality of notches therein, a pawl on the wheel slide for operating said ratchet wheel at each reciprocation of the slide, a cam tooth carried with the ratchet wheel, whereby when the ratchet wheel has been turned through an arc a predetermind number of times, the tooth will complete a revolution, a lever in position to be operated by the tooth when the revolution is completed, a wheel truing device, a hydraulic cylinder, means controlled by said tooth for allowing fluid under pressure to enter the hydraulic cylinder, means operated by the hydraulic cylinder for moving the truing tool to true off the grinding wheel, a second tooth ahead of the first one, a lever operated by the second tooth, an elongated plate connected with said lever to be operated thereby, a pawl in position to be operated by said plate, a ratchet wheel in position to be turned one tooth at each operation of the pawl, and means connected with said ratchet wheel for advancing the tooth slide a predetermined short distance at each operation thereof, whereby the wheel truing device will take off a definite amount of the stone at each operation and the stone will be set up by said pawl and ratchet wheel a distance to compensate therefor.

24. In a machine for grinding the crank-pins of crank-shafts, the combination of a table for supporting the crank-shaft to be ground, a grinding wheel, means for constantly rotating the grinding wheel, and means for indexing the crank-shaft around for bringing the different crank-pins in position for grinding, of a cylinder and piston connected with the table for moving it through a definite path, pistons and cylinders lengthwise, a grinding wheel slide, a piston and cylinder for operating the grinding wheel slide toward and from the work, a wheel truing tool, a piston and cylinder for moving the truing tool connected for indexing the crank-shaft around, an oil pump and means connected with said oil pump for supplying the several cylinders with oil under pressure to move the pistons therein for the purposes described.

25. In a grinding machine, the combination with means for supporting the work to be ground and means for rotating it, of a grinding wheel slide, a grinding wheel mounted on said slide, means for rotating the grinding wheel constantly, a hydraulic cylinder connected with said grinding wheel slide and tending constantly to advance it toward the work, a screw also connected with said grinding wheel slide, means for rotating said screw at a very slow rate of speed to control the action of said cylinder and feed the wheel toward the work at a controlled speed, a wheel truing device and means for operating the wheel truing device when the wheel slide is drawn back from the work a predetermined number of times.

26. In a crank-shaft grinding machine, the combination with a table having means for supporting a crank-shaft to be ground, a grinding wheel, a spacing bar adapted to be fixed with respect to the table and having seats therein, a lever having a roll for entering said seats and stopping the table and holding it in fixed position, a cam wheel having a series of cams thereon for engaging the other arm of the lever and moving the roll out of its seat, a cylinder having a piston connected with said table for operating it, means for introducing liquid into said cylinder for moving the table forward to bring the spacing bar into position for cooperation with the roll from one seat to the next, and means whereby when the roll is brought out of its seat the application of fluid to said cylinder will be cut off.

27. A crank grinding machine having a work carriage, a wheel base, a grinding wheel carried thereby, work supporting means on the work carriage, and automatically operated means for indexing the work axially and for rotating it to bring each of a plurality of crank pins into grinding position.

28. A crank grinding machine having a work carriage and a wheel base movable at right angles to the movement of the work carriage, a grinding wheel carried by said wheel base, work supporting means on the work carriage, fluid pressure means for indexing the work carriage to bring each of a plurality of crank pins into the plane of the grinding wheel and separate fluid pressure means for indexing the crank shaft about its axis to bring each of the crank pins into grinding position.

29. A grinding machine of the kind described having means for grinding the pins on a crank shaft and means for indexing the crank shaft axially to bring each of the pins to grinding position, and pressure fluid means for indexing said crank pin about its axis to bring each of the pins to grinding position.

30. A crank grinding machine comprising a work carriage, a grinding wheel carriage, pressure fluid means for moving each of said carriages with respect to the other, pressure fluid operated means mounted on said work carriage for clamping the crank shaft, and for releasing said crank shaft to permit rotation of the same about its axis and means for supporting the shaft to permit indexing of the shaft about its axis to bring each of a plurality of pins to grinding position before the grinding wheel.

31. A crank grinding machine of the kind described having a work carriage and a grinding wheel, automatic means for causing a rotary indexing of the shaft and for indexing the carriage axially of the shaft to bring each of a plurality of crank pins to the plane of the grinding wheel, and means for locating the said crank pin in accurate predetermined position before the grinding wheel.

32. A crank grinding machine of the kind described having a work carriage and a grinding wheel, automatic means for indexing the carriage axially of a crank shaft and for rotating the shaft to bring each of a plurality of crank pins to the plane of the grinding wheel, means for locating the said crank pin in accurate predetermined position before the grinding wheel, and separate means for accurately centering the crank shaft on the work centers.

33. A crank grinding machine comprising a work carriage, a grinding wheel carriage, hydraulically operated means for moving the wheel carriage at right angles to the movement of the work carriage, means for indexing the work carriage at right angles to the movement of the wheel carriage, pressure fluid means for operating the indexing mechanism and pressure fluid means for indexing the work about its axis to bring it to any one of a number of predetermined angular positions with respect to its supporting means whereby any predetermined portion of the work may be brought to a predetermined position before the grinding wheel.

34. In a machine for grinding crank shafts, the combination with a work table of a head stock mounted thereon having an eccentric center, a central spindle adapted to move longitudinally of the head stock, means for moving said spindle, and means operable upon the axial movement of said spindle for indexing said spindle about its axis.

35. In a grinding machine, the combination with a work table and work supporting means mounted thereon, of means for rotating the work on the axis about which the grinding operation is to take place, a grinding wheel support, a grinding wheel mounted on said support, a work rest, pressure field means for operating the wheel support and the said table and a cam wheel having a plurality of cams arranged to control operation of the several pressure fluid means for operating the table and the wheel support.

36. In a grinding machine, the combination with a work table and work supporting means mounted thereon, of means for rotating the work on the axis about which the grinding operation is to take place, a grinding wheel support, a grinding wheel mounted on said support, a work rest, pressure fluid means for operating the wheel support and the work table, a cam wheel having a plurality of cams arranged to control operation of the several pressure fluid means for operating the table and the wheel support, and automatically operated pressure fluid means for indexing the work on its axis to bring any one of a plurality of crank pins to correct radial position before the grinding wheel.

37. A machine for grinding sequentially all the pins on a crank shaft comprising a work carriage, a wheel support, a grinding wheel on said wheel support, means for indexing the work carriage axially and for indexing the work rotarily to bring each of the pins in correct grinding relation to bringing wheel, and means for automatically returning the carriage to the starting position after all the pins on the shaft have been completely ground.

38. In a grinding machine, in combination a work table, means for supporting the work on the table, means for rotating the work on the axis about which the grinding operation is to take place, a grinding wheel slide, a grinding wheel mounted thereon, a steady rest for the work, a plurality of cams for operating, respectively, the slide, the steady rest, and the work table and a cam wheel supporting some of said cams, substantially as set forth.

39. A grinding machine for grinding the pins of crank shafts comprising a work support, means for rotating the work about the axis of the pin to be ground, a wheel support, a steady rest for the work, means for moving the work support, the wheel support and the steady rest to bring them in proper sequence into and out of operative position and a cam wheel in control of said last named means, substantially as set forth.

40. In a grinding machine, in combination a work support, a grinding wheel support having a grinding wheel mounted thereon, a steady rest for the work, fluid pressure means for operating said supports, a cam wheel having cams thereon in control of said fluid pressure means, and means for indexing the work on its axis to bring the parts to be ground successively into grinding position, substantially as set forth.

41. A machine for grinding the pins of crank shafts comprising a work carriage, a wheel support, a grinding wheel mounted on said support, automatic means for indexing the shaft from one pin to bring another pin into position such indexing consisting of an axial movement of the shaft and a partial rotation of the shaft, and means for locking the shaft in correct indexed position, substantially as set forth.

42. In a machine of the kind described, a work support, a grinding wheel support, fluid means to provide a relative transverse and longitudinal movement between said supports, said longitudinal movement being an indexing movement, pressure fluid means for indexing the work about its axis, and means to effect said indexing movements simultaneously substantially as set forth.

43. In a machine of the kind described, a work support, a grinding wheel support, fluid means to provide a relative transverse and longitudinal movement between said supports, said longitudinal movement being an indexing movement, pressure fluid means for indexing the work about its axis to bring the work to any one of a number of predetermined angular positions with respect to its supporting means, substantially as set forth.

44. In a machine of the kind described having means for grinding selected portions of a work piece, fluid means to index said work piece axially to bring each portion to grinding position and automatic means to index said work piece about its axis to bring each portion into grinding position, substantially as set forth.

45. In a machine of the kind described, a work support, a wheel support, a steady rest, automatic means to provide a relative transverse and longitudinal movement of said parts, mechanism for effecting a rotary indexing of the work, automatic means to actuate said indexing mechanism, and means to actuate said supports, said steady rest and said index mechanism in a proper sequence, substantially as set forth.

46. In a machine of the kind described, a work support, a wheel support, a steady rest, automatic means to provide a relative transverse and longitudinal movement of said parts, mechanism for effecting a rotary indexing of the work, automatic means to actuate said indexing mechanism, means to actuate said supports, said steady rest and said index mechanism in a proper sequence, and means to vary the sequence of operations, substantially as set forth.

47. In a machine of the kind described, a work support, a wheel support, fluid means to provide a relative transverse and longitudinal movement of said supports, means on said work support to rotate a work piece, a work clamping fixture adapted to be rotated thereby and an automatic indexing mechanism separate from said work rotating means and adapted to be operated in timed relation with said transverse and longitudinal movements to rotate said clamping fixture to bring another portion of the work piece into grinding position, substantially as set forth.

48. In a machine of the kind described, a work support, a wheel support, a steady rest, automatic means to provide a relative transverse and longitudinal movement of said parts, an automatic wheel truing device, a device for effecting automatic rotary indexing of the work, and means to actuate said supports, steady rest, indexing device, and wheel truing device in proper sequence, substantially as set forth.

49. In a machine of the kind described, a grinding wheel, means to dress a formed wheel automatically at predetermined intervals, comprising a dressing tool, fluid means to pass said tool across the face of the grinding wheel, and a guide adapted to engage said tool to provide the desired contour on said wheel, substantially as set forth.

50. In a machine of the kind described, a grinding wheel having rounded edges, means to true said wheel comprising a truing tool, fluid means to traverse said tool, means to guide said tool to provide the desired contour, and automatic means to actuate said fluid means at predetermined intervals, substantially as set forth.

51. In a machine of the kind described, a work support, a tool support, means to effect relative transverse and longitudinal movement of said supports, means to effect said longitudinal movement intermittently to bring said tool support and a series of portions of a work piece into operative relation, a steady rest for supporting each of said pieces during the machining operation, automatic means to effect a movement of said steady rest toward and from a work piece, and means to effect said movement in timed relation to said longitudinal movement.

52. A machine of the kind described having a work support and a tool support, means to provide relative longitudinal movement of said supports, means to effect accurate positioning of one of said supports to place the tool and a succession of unfinished portions of a work piece in operative relation, comprising a notched spacing bar on one of said supports, an element for entering said notches to stop said relative movement, and means for adjusting said element and said notches relatively in the direction of movement of the support.

53. In a grinding machine a rotatable grinding wheel, a transversely movable wheel slide supporting said wheel, a longitudinally movable work table, means carried by the table to rotatably support a work piece having thereon a plurality of spaced portions to be ground, means to rotate said work piece, means to intermittently traverse said table to bring successive portions into position opposite the grinding wheel, means to automatically feed the wheel toward and from the work piece to grind said portions and means for automatically truing the grinding wheel after all of said portions have been ground.

54. In a grinding machine a rotatable grinding wheel, a transversely movable wheel slide supporting said wheel, a longitudinally movable work table, means carried by the table to rotatably support a work piece having thereon a plurality of spaced portions to be ground, means to rotate said work piece, means to intermittently traverse said table to bring successive portions into position opposite the grinding wheel, means to automatically feed the wheel toward and from the work piece to grind said portions and means for automatically truing the grinding wheel after the grinding of a predetermined number of work pieces.

55. A grinding machine comprising a rotatable grinding wheel, a transversely movable wheel slide for supporting said wheel, a longitudinally movable work table, means to rotatably support a work piece having a plurality of spaced portions to be ground which are eccentrically set relative to the axis of said work piece, means to rotate said work piece, means to intermittently traverse said work table to bring successive portions into position opposite the grinding wheel, means to automatically feed the wheel toward and from the work piece to grind said portions and means for automatically truing the grinding wheel after all said portions have been ground.

56. A crank grinding machine comprising a rotatable grinding wheel, a transversely movable wheel slide for supporting said wheel, a longitudinally movable work table, means to rotatably support a work piece having thereon a plurality of spaced cranks to be ground, automatic means for causing a rotary indexing of the shaft and for indexing the work table axially of the shaft to bring each of a plurality of crank pins to the plane of the grinding wheel, means to automatically feed the wheel toward and from the work piece to grind each crank and means for automatically truing the grinding wheel after all of said cranks have been ground.

57. A cam grinding machine comprising a base, a rotatable grinding wheel, a transversely movable wheel slide to support said wheel, a longitudinally movable work table on said base, means to rotatably support a camshaft having a plurality of spaced cams thereon, means to rotate said camshaft, means to intermittently traverse said table in one direction to bring successive cams into position opposite the grinding wheel, means to automatically feed the wheel toward and from the camshaft to grind said cams, and means for automatically truing the grinding wheel after all of said cams have been ground.

58. A crank grinding machine comprising a base, a rotatable grinding wheel, a transversely movable wheel slide to support said wheel, a longitudinally movable work table on said base, means to rotatively support a crank shaft having a plurality of spaced cranks thereon, means to rotate said crank shaft, means to intermittently traverse said table in one direction to bring successive cranks into position opposite the grinding wheel, means to automatically feed the grinding wheel toward and from the crank shaft to grind said cranks, and means for automatically truing the grinding wheel after all of said cranks have been ground.

HERMAN F. KLINGELE.